PHASE DIAGRAM FOR SYSTEM SODIUM HYDROXIDE-ALKYL PHENOL-WATER
TEMPERATURE 80°F

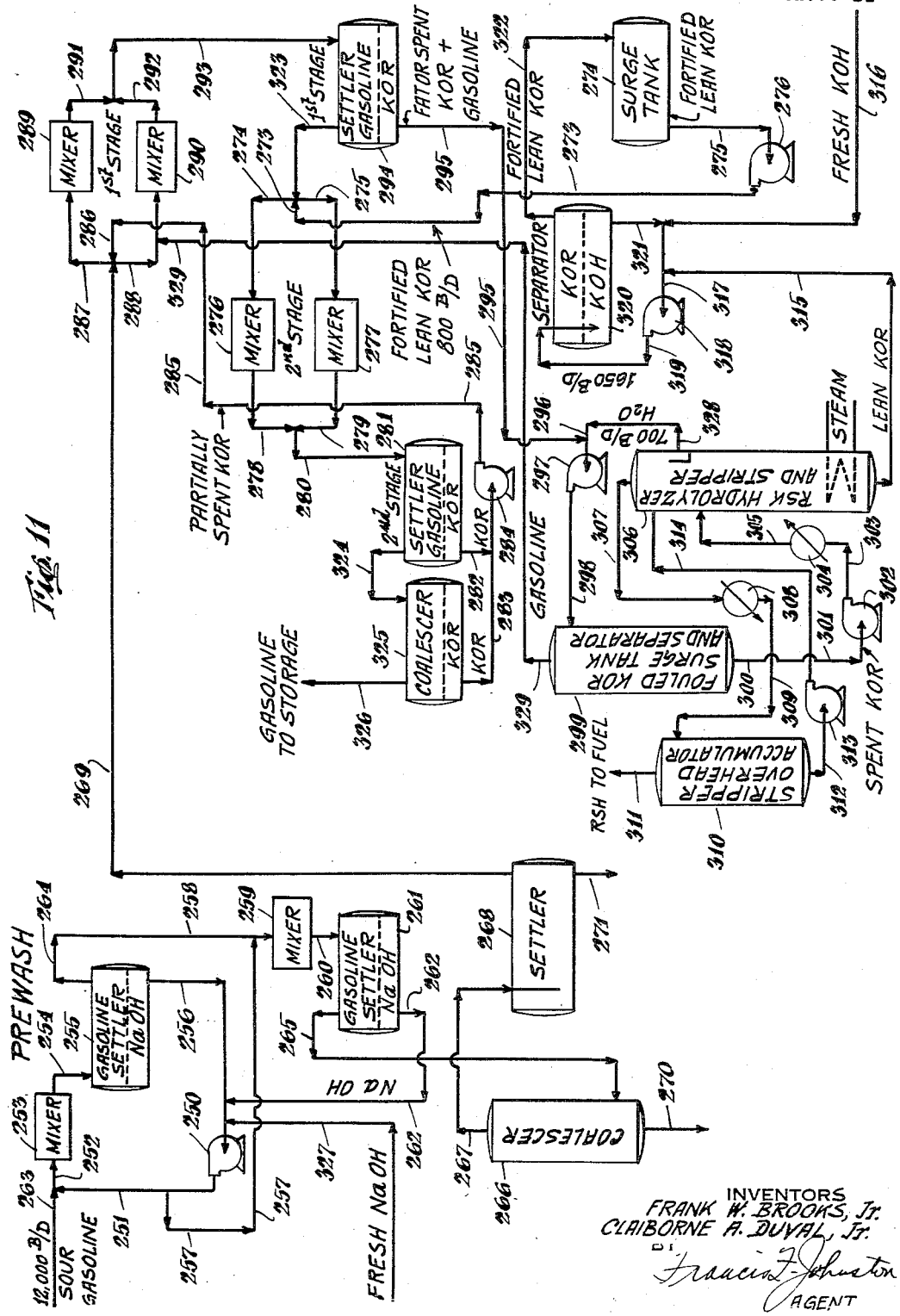

Sept. 2, 1958  F. W. BROOKS, JR., ET AL  2,850,434
PROCESS FOR PURIFYING PETROLEUM WITH MULTI-PHASE
TREATING SOLUTIONS OF ALKYL PHENOLS AND ALKALI
AND PROCESS FOR REGENERATING SAID SOLUTIONS
Filed Jan. 30, 1956  14 Sheets-Sheet 12
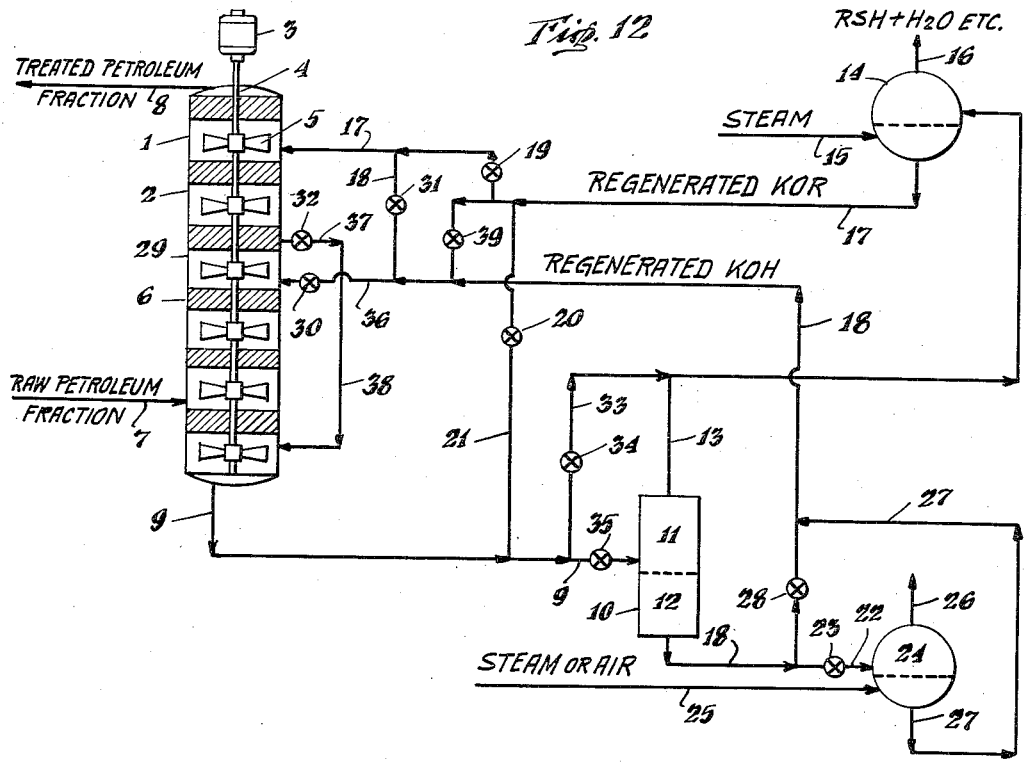
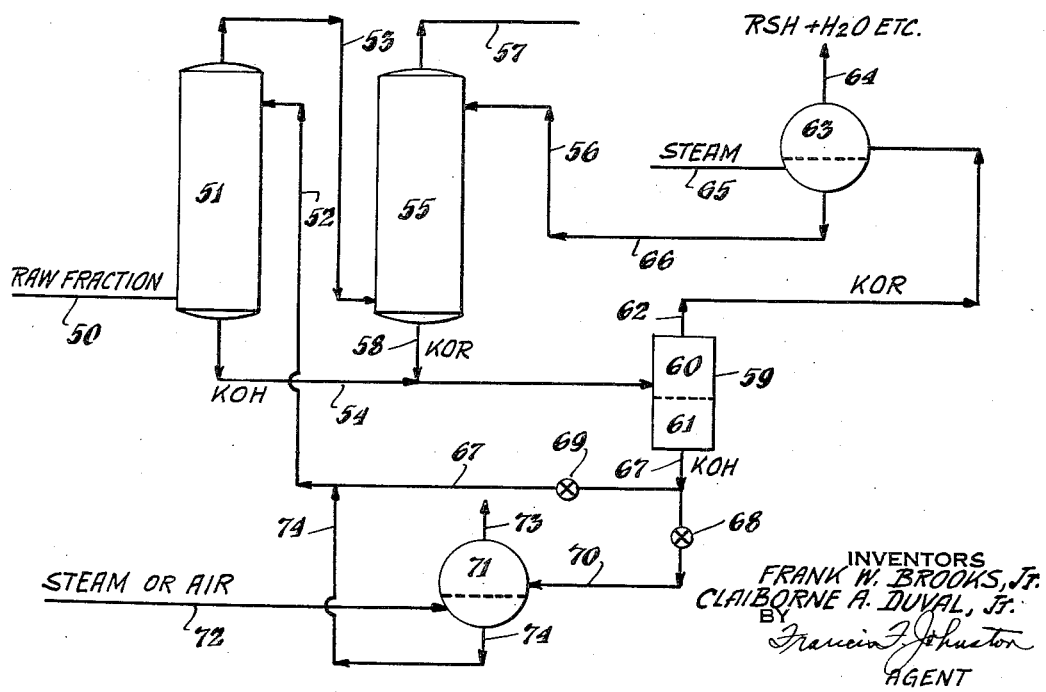
INVENTORS
FRANK W. BROOKS, Jr.
CLAIBORNE A. DUVAL, Jr.
BY
Francis F. Johnston
AGENT

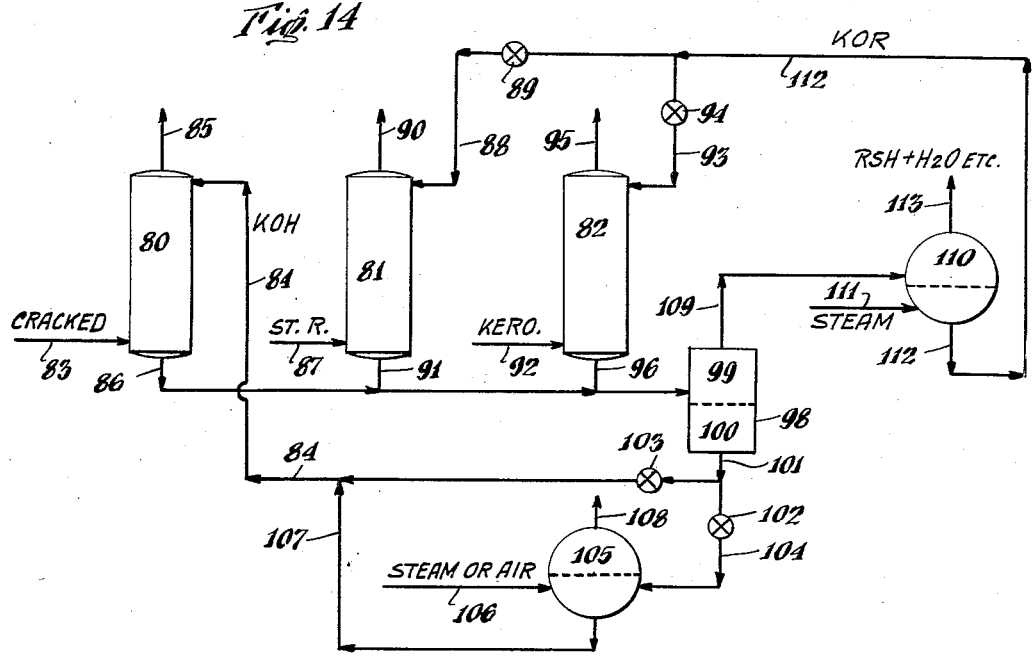

Sept. 2, 1958     F. W. BROOKS, JR., ET AL     2,850,434
PROCESS FOR PURIFYING PETROLEUM WITH MULTI-PHASE
TREATING SOLUTIONS OF ALKYL PHENOLS AND ALKALI
AND PROCESS FOR REGENERATING SAID SOLUTIONS
Filed Jan. 30, 1956     14 Sheets-Sheet 14

INVENTORS
FRANK W. BROOKS, Jr.
CLAIBORNE A. DUVAL, Jr.

AGENT 2,850,434
Patented Sept. 2, 1958

2,850,434

PROCESS FOR PURIFYING PETROLEUM WITH MULTI-PHASE TREATING SOLUTIONS OF ALKYL PHENOLS AND ALKALI AND PROCESS FOR REGENERATING SAID SOLUTIONS

Frank W. Brooks, Jr., and Claiborne A. Duval, Jr., Beaumont, Tex., assignors to Socony Mobil Oil Company, Inc., New York, N. Y., a corporation of New York Application January 30, 1956, Serial No. 562,241

20 Claims. (Cl. 196—32)

The present invention relates to the removal of acidic organic material, especially mercaptans, from hydrocarbon fluids. More particularly, the present invention relates to the removal of mercaptans from hydrocarbon fluids directly or indirectly or directly and indirectly with a liquid mixture of water, solutizer salt of an alkali metal hydroxide and alkali metal hydroxide which liquid mixture is substantially immiscible with aqueous alkali metal hydroxide solutions.

It is recognized that aqueous alkaline solutions will extract acidic organic material from non-miscible organic liquids in a manner readily adapted to separation of the extracting medium and contained extracted acidic material from the treated non-miscible organic fluid. This concept was applied to the sweetening or removal of weakly acidic sulfur compounds from hydrocarbon fluids as soon as the necessity therefor arose. However, subsequently it was found that the capacity of aqueous alkaline solutions, especially aqueous alkali metal hydroxide solutions for extracting weakly acidic sulfur compounds, i. e., mercaptans or alkyl and aryl sulfhydryls, can be markedly increased by incorportion in the aqueous alkali metal hydroxide extracting or treating solution an organic material designated a solutizer.

Typical of the disclosures of the use of solutizers in conjunction with aqueous alkaline treating solutions for the extraction or removal of acidic organic material, particularly alkyl and/or aryl mercaptans from hydrocarbon fluids, are the disclosures of D. L. Yabroff and his colleagues. Thus, in U. S. Patent No. 2,059,075 Yabroff and Givins disclose that quaternary ammonium bases having a formula

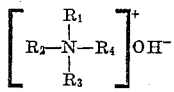

in which $R_1$ to $R_4$ are alkyl, unsaturated alkyl, aryl, or aralkyl radicals which may contain polar substitution groups selected from the class of —OH, —$NH_2$, —$NO_2$ and halogen or heterocyclic radicals which are linked to the quaternary nitrogen atom by way of a carbon atom which carbon atom may or may not be part of the heterocyclic ring, can be used in conjunction with aqueous alkali metal hydroxide solutions 2.5 N to sodium hydroxide, i. e., 10 weight percent sodium hydroxide solution, to extract mercaptans from hydrocarbon fluids. These patentees disclose that the quaternary ammonium bases which they included within the class defined are soluble in 2.5 N (10 weight percent) NaOH, to the extent of about 50 percent.

In U. S. Patent No. 2,066,925, Yabroff and Givins disclose that ternary sulfonium bases having the formula

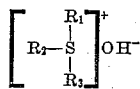

in which $R_1$, $R_2$ and $R_3$ are alkyl, unsaturated alkyl, aryl or aralkyl radicals which may contain polar groups selected from the class of —OH, —$NH_2$, —$NO_2$, and halogen, or heterocyclic radicals which are linked to the ternary sulfur atom by way of a carbon atom, which carbon atom may or may not be part of the heterocyclic ring. This class of solutizer is employed according to this disclosure in conjunction with alkali metal hydroxide in aqueous solutions in which the concentration of the sulfonium base does not exceed about 50 weight percent and the concentration of sulfonium base plus alkali metal hydroxide does not exceed 60 weight percent.

Another class of solutizers is disclosed in U. S. Patent No. 2,149,379. The class disclosed in the patent is the alkali metal salts of the lower fatty acids having 3 to 5 carbon atoms in the molecule which are used in concentrations up to about 45 weight percent in aqueous alkali metal hydroxide solutions containing up to 20 weight percent alkali metal hydroxide. U. S. Patent No. 2,149,380 is directed specifically to the use of treating solutions containing alkali metal hydroxide up to about 40 weight percent which is about 85 percent saturated with potassium isobutyrate.

In U. S. Patent No. 2,152,166 Yabroff describes the use of aqueous alkaline treating solutions which are up to 2.5 N to alkali metal hydroxide, about 25 to about 75 percent polyhydroxy polar compounds such as propylene glycol, triethylene glycol, butylene glycol and about 5 to about 70 percent water.

Other solutizers such as the salts of the alpha hydroxy and alpha amino fatty acids having 3 to 7 carbon atoms in the molecule are disclosed in U. S. Patent No. 2,152,722; diamino alkanols having 3 to 5 carbon atoms (U. S. Patent No. 2,152,723); metal salts, particularly alkali metal salts of substituted fatty acids having up to 7 carbon atoms (U. S. Patent No. 2,156,577); alkali metal salts of phenyl acetic acid and hydroxy and amino phenyl acetic acid (U. S. Patent No. 2,164,851); amino diols such as amino dihydroxy propane (U. S. Patent No. 2,168,078); alkali metal alkyl phenolates (U. S. Patent No. 2,202,039); alkali metal alkyl phenolates in combination with an alkali metal salt of an aliphatic monocarboxylic acid having 1 to 8 carbon atoms (U. S. Patent No. 2,223,798); alkali metal salts of aliphatic dicarbocyclic acids such as alkylene succinic acids which can be obtained by the reduction of phthalic acid and its homologues to the corresponding alicyclic dicarboxylic acid such as glutarate, adipate, undecene dicarboxylate and the like (U. S. Patent No. 2,229,995) are known to the art. However, all of these prior art treating or extracting solutions are single phase aqueous solutions in which neither the concentration of alkali metal hydroxide nor the concentration of solutizer salt is sufficiently high to cause the formation of a solutizer salt phase substantially immiscible with an aqueous alkali metal hydroxide phase. Thus, for example, the Henderson U. S. Patent No. 2,317,054 is directed to a method of extracting mercaptans in which the extracting medium is an aqueous solution in which the concentration of the reaction product of the organic acidic materials and the alkali metal hydroxide does not exceed 90% of saturation. Similarly, U. S. Patent No. 2,316,965 discloses a method of removing mercaptans from hydrocarbon fluids in which the concentration of the salt of the organic acidic material and alkali metal does not exceed the limit of solubility of the acidic material employed.

In distinct contrast to the prior art extracting or treating solutions in which the concentration of solutizer salt does not exceed the solubility limit of that solutizer salt in the aqueous alkaline medium in which it is present, the extracting medium of the present invention is a liquid containing free alkali metal hydroxide, an alkali metal salt or salts of one or more solutizers and water which liquid is substantially immiscible in aqueous solutions of alkali metal hydroxide. For a better understanding of the present invention, reference will be made to the prior art use of alkali metal salts of alkyl phenolates particularly potassium alkyl phenolates in conjunction with alkali metal hydroxide such as potassium hydroxide.

For many years, mixtures of hydrocarbons particularly petroleum distillates containing organic sulfhydryls such as alkyl mercaptans and aryl mercaptans or thiophenols have been treated (1) to convert in situ the sulfhydryls to inoffensively smelling polysulfides, or (2) to remove the sulfhydryls from the hydrocarbon mixture. Either procedure results, when the sulfhydryl content is reduced sufficiently that the treated hydrocarbon mixture is negative in the "doctor test" in a hydrocarbon mixture which is said to be "sweet." The methods by which such "sweet" fractions are produced are generally known as sweetening.

Among the commercially practiced methods for removing organic sulfhydryls, i. e., alkyl and aryl mercaptans or mercaptans and thiophenols, all of the latter designations being widely used in the art, is that of contacting the hydrocarbon mixture containing mercaptans and/or thiophenols with aqueous alkaline solutions ranging in composition from 5 normal potassium hydroxide-2 normal potassium alkyl phenolates to 6 normal potassium hydroxide-3 normal potassium alkyl phenolate also written 5 N KOH—2 N KAP to 6 N KOH—3 N KAP. It is also common usage to speak of the alkyl phenolates as cresylates. The alkyl phenolates or cresylates are usually those alkyl phenols extracted from the lower boiling fractions of petroleum such as gasoline and light naphthas.

The alkyl phenolates or cresylates are used in conjunction with potassium hydroxide because solutions containing free alkali metal hydroxide, such as potassium or sodium hydroxide, in combination with the alkali metal salts of the alkyl phenols or cresols have a greater solvent power for organic sulfhydryls than an aqueous solution having the same concentration of alkali metal hydroxide but substantially devoid of alkali metal salts of the alkyl phenols.

Aqueous solutions ranging in composition from 5 N KOH—2 N KAP (21 weight percent KOH, 24 weight percent KAP (alkyl phenols) and 55 weight percent water) to 6 N KOH—3 N KAP (24 weight percent KOH, 33 weight percent KAP and 43 weight percent water) are used because of their sulfhydryl extracting power. Hereinafter, the more commonly used term, mercaptan, will be employed to include not only the alkyl sulfhydryls but also the aryl sulfhydryls or thiophenols. The limiting factors in the selection of solution strength are usually (1) the viscosity of the aqueous extracting solution, (2) the limit of solubility of the alkyl phenols in the aqueous alkali metal hydroxide solution, and (3) the alkyl phenol balance of the system, fraction being treated-extracting solution.

Such solutions are often difficult to maintain at the desired strength in commercial operation. When the alkyl phenol content of the raw or untreated fraction is extremely low, the alkyl phenols of the extracting solution migrate to the oil fraction being treated thereby lowering the alkyl phenol content of the extracting solution and reducing its extracting capability. On the other hand, when the alkyl phenol content of the raw or untreated fraction is high, it is necessary to prewash the raw fraction to remove a portion of the alkyl phenols so that the alkyl phenol content of the extracting solution will not be unduly increased. The increase in the alkyl phenol content of the extracting solution reduces the concentration of free or uncombined alkali metal hydroxide and dilution of the extracting solution by the water produced in the reaction of the alkyl phenols with the free alkali metal hydroxide.

As now used, the prior art method of removing mercaptans from mixtures of hydrocarbons involves contacting the mixture of hydrocarbons with a single-phase aqueous solution of alkali metal hydroxide, or a single phase aqueous solution of alkali metal hydroxide and alkali metal phenolates. The aqueous solution of alkali metal hydroxide only is not used to any great extent because of the low solubility of the $C_4+$ mercaptans in such solutions. Consequently, in general, the extracting solutions usually comprise free alkali metal hydroxide and solutizer salt. Because of the economies involved, the solutizer now used is the alkyl phenols and for various reasons the alkali metal hydroxide is potassium hydroxide.

Accordingly, present practice is to contact the mixture of hydrocarbons containing mercaptans with an aqueous solution which is 5 to 6 normal to potassium hydroxide and 2 to 3 normal to potassium alky phenolates in one or more extraction stages. Usually the process is carried out in such a manner that the extracting solution is continuously regenerated. Regeneration of the fouled or rich extracting solution is accomplished either by steam distillation thereof whereby the mercaptides, i. e., the alkali metal salts of the mercaptans, are decomposed and the mercaptans volatilized or the mercaptides are converted to polysulfides by oxygen in the presence or absence of an oxidation promoter.

Either method of regeneration is costly for utilities, and in addition, when the fouled extracting solution is regenerated with air, the alkyl phenolates are oxidized to acidic materials which form crystalline alkali metal salts which are precipitated, thus reducing the free alkalinity of the regenerated extracting solution. Consequently, a method of demercaptanizing or sweetening mixtures of hydrocarbons in which the volume of extracting solution to be regenerated can be reduced from that presently regenerated by steam or one in which the amount of solution regenerated by oxidation is less than presently used has definite advantages over the present manipulations of such aqueous extracting solutions.

Before discussing in detail the principles of the present invention employing an extracting medium liquid at the extraction temperature comprising water, free alkali metal hydroxide and alkali metal salt of a solutizer which extracting medium is substantially immiscible with aqueous alkali metal hydroxide solutions, it is considered desirable to distinguish between the previously used treating or extracting solutions containing in solution in an aqueous alkali metal hydroxide solution an alkali metal salt of a solutizer and the extracting medium of the present invention. Since the solutizer solution most widely used in industrial operations is the potassium hydroxide-potassium alkylphenolate (cresylate) solution, a comparison will be made between the aforementioned 6 N KOH—3 N KAP solution and the potassium hydroxide-potassium cresylate-water extracting medium of the present invention. This can be most readily accomplished by reference to drawing, Figures 1, 2, 3 and 4.

The mercaptan extracting solutions now employed are three component systems in which the three components are (1) water, (2) alkali metal hydroxide, and (3) alkyl phenol. The system water, potassium hydroxide and potassium salts of the phenols present in petroleum fractions boiling between about 200° F. to about 650° F., hereinafter designated as potassium cresylate, has been studied in sufficient detail to provide the data from which the ternary diagrams presented as Figures 1, 2, 3 and 4 have been prepared.

Figure 1 is a ternary diagram of the system water-potassium cresylate-potassium hydroxide. Apex A of the triangle represents 100 weight percent water, zero weight percent potassium hydroxide and potassium cresylate; apex B represents 100 weight percent potassium hydroxide, zero weight percent water and potassium cresylate;

and apex C represents 100 weight percent of the aforesaid salts of potassium designated "potassium cresylate," zero weight percent water and potassium hydroxide. The sides of the triangle represent percentage composition by weight of various mixtures of two components. Thus, side A–C represents mixtures of the components, water and potassium cresylate, between 100 weight percent water, zero weight percent potassium cresylate and 100 weight percent potassium cresylate, zero weight percent water. Side A–B represents mixtures of the components water and potassium hydroxide between 100 weight percent water, zero weight percent potassium hydroxide and 100 weight percent potassium hydroxide, zero weight percent water. Side B–C represents mixtures of the components potassium hydroxide-potassium cresylate between 100 weight percent potassium hydroxide, zero weight percent potassium cresylate and 100 weight percent potassium cresylate, zero weight percent potassium hydroxide. Thus, any point within the triangle represents a mixture of the three components in certain concentrations expressed as weight percent.

It has been found that the system water-potassium hydroxide-potassium cresylate when in equilibrium at 90° F. forms a homogeneous one-phase system when the composition of the system is that represented by any point within the triangle to the left of line C–D, i. e., the phase boundary line and that the system is a heterogeneous, two-phase system when the composition thereof is represented by any point within the triangle to the right of the aforesaid line CDB, i. e., the phase boundary line.

The present invention is concerned with the use of mixtures of water-alkali metal hydroxide-alkali metal cresylate, i. e., alkali metal salts of the phenols extracted from petroleum fractions boiling within the range of about 200° F. to about 600° F., which are represented by points within the area bounded by the lines CD, DB and BC, i. e., the heterogeneous two-phase system, from which the extracting medium for direct, or indirect or both direct and indirect extraction of mercaptans are obtained.

It will be observed that superposed upon the left side of the basic ternary diagram are lines indicating the concentration expressed as weight percent equivalent to potassium cresylate normalities of zero-to-8 normal and equivalent to potassium hydroxide normalities of zero-to-9 normal. Thus, an aqueous 2 normal potassium cresylate solution contains about 23–24 weight percent potassium cresylate. An aqueous 5 normal potassium hydroxide solution contains about 21 weight percent potassium hydroxide. It follows then that the prior art aqueous potassium hydroxide-potassium cresylate solutions which are 2–3 normal potassium cresylate (KAP) and 5–6 normal potassium hydroxide are represented in Figures 1, 2, 3 and 4 by the cross-hatched area in each figure.

In Figure 2 there is superposed upon the basic ternary diagram a family of curves indicating the compositions of various water-potassium cresylate-potassium hydroxide solutions which are in equilibrium with a hydrocarbon oil phase having a constant alkyl phenol or cresol concentration expressed as parts of cresol per million parts of oil. Thus, the line bearing the legend 20, is drawn through the points on the diagram representing the various mixtures of water-potassium cresylate-potassium hydroxide which are in equilibrium with a hydrocarbon oil containing 20 parts of cresols per million parts of oil. Likewise, the line bearing the legend 30 is drawn through the points on the diagram representing the various mixtures of water-potassium cresylate-potassium hydroxide which are in equilibrium with a hydrocarbon oil containing 30 parts of cresols per million parts of oil.

Heretofore, is has been considered that the compositions of water-alkali metal hydroxide-alkali metal cresylate solutions were limited to those represented by the cross-hatched area of Figure 2, by reason of the migration of alkyl phenols or cresols from oil being treated to the treating solution dependent upon the composition of the treating solution. In other words, those skilled in the art taught that when the composition of the treating solution was other than that represented by the cross-hatched area of Figure 2, the concentration of alkyl phenols or cresols in the oil being treated when in equilibrium with the treating solution having a composition represented by points outside the cross-hatched area would not be the same as the value from an oil in equilibrium with a treating solution having a composition represented by a point within the cross-hatched area. As the family of curves in Figure 2 establish, the prior teaching was incorrect and the limitations imposed by the prior art as a result thereof has precluded the use of treating solutions of other compositions. In other words, prior to applicants' discovery it was taught that compositions, such as represented by the sections KF and EC of the curve bearing the legend 30, were not in equilibrium with hydrocarbon oils containing 30 parts of cresols per million parts of oil and that consequently alkyl phenols would migrate from the oil to the treating solution or from the treating solution to the oil. As a consequence of migration from the oil to the treating solution, the capacity of the solution to extract mercaptans would be reduced by the equivalent of the alkali metal hydroxide neutralized by the cresols. In other words, the prior art taught that as the concentration of alkyl phenols (cresols) increased in the treating solution from the prior art maximum of about 2.2 normal (27 weight percent) such solution would not be in equilibrium with hydrocarbon oils containing 30 parts per million of cresols. In contrast, it has now been discovered that treating solutions having compositions represented by the points along the line bearing the legend 30, are in equilibrium with hydrocarbon oils containing 30 parts per million akyl phenols. Thus, it has now been discovered that treating solutions of many compositions not contemplated by those skilled in the art are competent for treating hydrocarbon oils containing alkyl phenols as well as mercaptans. The importance of this discovery becomes apparent upon consideration of Figure 3.

Two families of curves are presented in Figure 3. Those drawn with continuous lines represent the mercaptan sulfur in oil in equilibrium with treating solutions of various compositions, while those drawn with discontinuous lines represent the viscosity in centistokes of treating solutions of various compositions. Thus, the discontinuous line beginning at 2Δ represents the compositions of solutions having a constant viscosity of 2 centistokes. The discontinuous lines beginning at 5Δ and 12Δ represent respectively the compositions of mixtures having a constant viscosity of 5 to 12 centistokes. The mixtures represented by the points on the continuous line bearing the legend 0.044 are those which are in equilibrium with the oil shown containing 0.044 weight percent mercaptan sulfur, while the mixtures having compositions represented by points on the line bearing the legend 0.001 are those which are in equilibrium with the oil containing 0.001 weight percent mercaptan sulfur. In other words, any mixture of water, potassium cresylates and potassium hydroxide having a composition represented by a point on the line bearing the legend 0.001 can be used to treat the gasoline to yield a treated gasoline containing 0.001 weight percent mercaptan sulfur. It will be noted that the presently used aqueous solutions of potassium hydroxide and potassium cresylate are only a small portion of the mixtures which can be used.

The significance of the data plotted in Figures 2 and 3 can be more readily recognized by reference to Figure 4 where the data from Figures 2 and 3 have been plotted together. The presently recommended aqueous prior art solutions which can be used to produce a treated gasoline having a mercaptan sulfur content of 0.001 weight percent are those having compositions represented by the triangular portion of the cross-hatched area in the upper right corner of the parallelogram. On the other hand, it is manifest that all mixtures of water, alkyl phenol and potassium hydroxide to the right of the discontinuous curve bearing the legend 0.001 are suitable for treating a petroleum fraction similar to the one shown having a mercaptan sulfur concentration greater than 0.001 to produce a treated petroleum fraction having a mercaptan sulfur concentration of about 0.001. The other discontinuous curves bearing respectively the legends 0.005, 0.010, 0.028 and 0.044 are interpreted in an analogous manner. These lines would be displaced for other oils or other mercaptan sulfur compounds.

While the use of solutions of water-alkali metal hydroxide-alkali metal alkyl phenolate having compositions falling on points outside the cross-hatched areas of Figures 1, 2, 3 and 4 is not within the scope of the present invention, the present invention is concerned particularly with the use for extracting mercaptans from mixtures of hydrocarbons of solutions having compositions represented by points within the area of the ternary diagrams bounded by the lines BD, DC and CB, and particularly those having compositions represented by points on the line DC.

One advantage inherent in the use of the solutizer salt phase of solutions having compositions represented by points on line DC is the fact that the cost of the alkali metal hydroxide in the circulating treating solution is less than that of mixtures, the compositions of which are represented by points to the right of line DC. An advantage in the use of the solutizer salt phase of mixtures, the compositions of which are represented by points on the line DC or to the right thereof, is the ease of separation of the mercaptans from the treating solution and the small amount of the mixture required to treat a given volume of a mixture of hydrocarbons containing mercaptans.

Illustrative of the advantage of using the solutizer salt phase which is immiscible with aqueous alkali metal hydroxide solutions is the $Kg$ value for such a solutizer salt phase.

Referring now to Figure 5 which is a ternary diagram of the system water-potassium hydroxide-alkyl phenol at 80° F. The ASTM distillation and API gravity of these alkyl phenols (cresols) is given in the following tabulation.

| | |
|---|---|
| Gravity, ° API | 4.9 |
| ASTM distillation: | |
| I. B. P | ° F 358 |
| 5% | ° F 378 |
| 10% | ° F 380 |
| 20% | ° F 382 |
| 30% | ° F 384 |
| 40% | ° F 386 |
| 50% | ° F 389 |
| 60% | ° F 391 |
| 70% | ° F 395 |
| 80% | ° F 400 |
| 90% | ° F 409 |
| E. P | ° F 440 |

A solution having a composition represented by point A on Figure 5 comprising 19 weight percent of the aforedescribed alkyl phenols, 44 weight percent potassium hydroxide and 37 weight percent water separates into a solutizer salt (cresylate) phase represented by the point on line R–S bearing the legend KOR and an aqueous potassium hydroxide solution represented by the point bearing the legend KOH. The aqueous potassium hydroxide solution contains 51 weight percent potassium hydroxide. The solutizer salt phase (substantially immiscible with the aforesaid 51 weight percent potassium hydroxide solution) is composed of 36.2 weight percent KOH, 36.6 weight percent alkyl phenols (cresols) and 27.2 weight percent water.

The $Kg$ values for the aforesaid cresylate phase and a 6 N KOH—3 N KAP solution were determined. These values are given in the following tabulation:

| Mercaptan | Hydrocarbon fluid | Kg cresylate phase (KOR) | 6 N KOH— 3 N KAP |
|---|---|---|---|
| C₂ ethyl | Iso-octane | 2,640 | 1,070 |
| C₃ n-propyl | do | 1,520 | 595 |
| C₄ n-butyl | Iso-octane | 710 | 350 |
| | TCC gasoline | 700 | 390 |
| | WTSR gasoline | 670 | |
| | 300–400 naphtha | 780 | 303 |
| C₄ iso-butyl | Iso-octane | 400 | 217 |
| | WTSR gasoline | 300 | |
| C₅ n-amyl | Iso-octane | 510 | 271 |
| | TCC gasoline | 453 | 212 |
| | 300–400 naphtha | 495 | 225 |
| | WTSR gasoline | 463 | |

$$Kg = \frac{\text{Mols RSH-S/liter soln. at 100° F.}}{\text{Mols RSH-S/liter gasoline}}$$

TCC—Thermofor catalytic cracked.
WTSR—West Texas straight run.
6 N KOH—3 N KAP: KOH-36 weight percent, HAP-26 weight percent, H₂O-38 weight percent.

Those skilled in the art will recognize that distribution coefficients for the cresylate phase indicate a far greater extractive capacity than that of the prior art presently used 6 N KOH—3 N KAP solution. Thus, for example, the $Kg$ values indicate that the cresylate phase (KOR solution) has about twice the capacity of the standard solutizer solution for n-amyl mercaptan. This indication is corroborated by the fact that at a given extraction medium to gasoline ratio the KOR phase reduces the mercaptan content of a hydrocarbon fluid to a lower value than is reached by using the standard solutizer solution and by the fact that at lower ratios the KOR phase reduces the mercaptan content of the hydrocarbon fluid to the same extent as the greater volume of standard solutizer solution. These facts are established by the data presented in the following tabulation:

Hydrocarbon fluid: West Texas straight run gasoline mercaptan sulfur, percent wt.: 0.129

| | KOR phase | | | Standard solutizer 6 N KOH— 3 N KAP | |
|---|---|---|---|---|---|
| Treating medium composition, weight percent: | | | | | |
| KOH | 36.2 | | | 36.0 | |
| HAP | 36.6 | | | 26.0 | |
| H₂O | 27.2 | | | 38.0 | |
| Treating ratio, vol. treating medium vol. gasoline | 0.05 | 0.10 | 0.20 | 0.33 | 0.20 |
| Mercaptan sulfur, weight percent: | | | | | |
| After 1st stage | 0.0140 | 0.0065 | 0.0046 | 0.002 | 0.0123 |
| After 2d stage | 0.0024 | 0.001 | 0.001 | | 0.003 |

It will be noted that the KOR phase is as effective in removing mercaptans in two stages at a treating medium to gasoline ratio of 0.05 (1 volume of treating medium to 20 volumes of gasoline) as the standard 6 N KOH—3 N KAP solution is at a treating ratio of 0.20 (4 volumes of treating medium to 20 volumes of gasoline). In other words, one volume of KOR phase will do the work of 4 volumes of 6 N KOH—3 N KAP solutizer solution.

Similar results are obtained in extracting mercaptans from petroleum fractions boiling above the gasoline range as is manifest from even a cursory study of the following data.

Hydrocarbon fluid: West Texas sour straight run kerosine mercaptan sulfur content, wt. percent: 0.121

|  | KOR |  | 6 N KOH— 3 N KAP |
|---|---|---|---|
| Treating medium composition, weight percent: |  |  |  |
| KOH | | 36.2 | 36 |
| HAP | | 36.6 | 26 |
| H₂O | | 27.2 | 38 |
| Treating ratio | 0.20 | 0.33 | 0.20 |
| After 1st stage | 0.032 | 0.024 | 0.05 |
| After 2d stage | 0.0140 | 0.0108 | |

These data establish that at a treating ratio of 0.20 the KOR phase removes in the first stage 73.5 percent of the mercaptan sulfur from the kerosine while at the same treating ratio the solutizer solution only removes 58.6 percent. In the second stage the removal of mercaptan sulfur is raised to 88.5 percent when using the KOR phase as the treating medium.

It was suggested by Yabroff and others particularly in U. S. Patent No. 2,202,039 that solutizer solutions having a viscosity greater than 37½ centistokes should not be used because of the uneconomical loss of entrained oil. On the other hand, it has been found that the loss of entrained oil actually is relatively and absolutely less with the KOR treating media of the present invention than with solutizer solution. The data supporting this assertion is presented in the following tabulation:

Hydrocarbon fluid: West Texas sour gasoline Feed: 10,000 barrels/day

|  | KOR phase | 6 N KOH— 3 N KAP |
|---|---|---|
| Treating ratio | 0.05 | 0.20 |
| Composition, weight percent: | | |
| KOH | 36.2 | 36 |
| HAP | 36.6 | 26 |
| H₂O | 27.2 | 38 |
| Treating solution, B./D | 500 | 2,000 |
| Stripping steam, B./D | 628 | 628 |
| Volume of oil retained, B./D.: | | |
| Between dilution | 12 | 20 |
| After dilution | 1.6 | 9.2 |
| Oil content treating solution, vol. percent: | | |
| Before dilution | 2.30 | 1.00 |
| After dilution | 0.22 | 0.46 |

That is to say, after dilution the KOR phase retains 1.6 barrels while the solutizer solution retains 9.2 barrels or approximately 6 times as much oil.

As was emphasized hereinbefore, mixtures of alkali metal hydroxide, alkyl phenol and water having compositions represented by points on the line DC, or to the right thereof, form two phases. As a consequence of this phenomenon, it is possible to treat mixtures of hydrocarbons by several methods taking advantage of this peculiarity of the system.

In the light of these facts and in accordance with the principles of the present invention the MOS phase of mixtures of the compositions of which are represented by points to the right of the phase boundary line of the ternary diagrams for the system alkali metal hydroxide-solutizer or solutizer salt-water can be used to extract mercaptans from hydrocarbon fluids directly or indirectly or directly and indirectly. That is to say, the hydrocarbon fluid can be contacted with the MOS phase (a phase containing alkali metal hydroxide-alkali metal salt of a solutizer and water) to extract mercaptans in one or more stages, preferably two or more stages, to produce a treated hydrocarbon fluid of reduced mercaptan content and a fouled treating medium (fouled MOS phase), the treated hydrocarbon fluid separated from the fouled treating medium and the fouled treating medium stripped with steam or otherwise denuded of mercaptans. This is direct extraction of mercaptans.

In indirect extraction of mercaptans, the hydrocarbon fluid is contacted with an aqueous alkali metal hydroxide solution with which the MOS phase is substantially immiscible to obtain a treated hydrocarbon fluid and a fouled treating medium (MOH). The fouled treating medium is then contacted with a lean, i. e., substantially mercaptan free or stripped MOS medium with which the fouled MOH treating medium is substantially immiscible.

The mercaptans extracted from the hydrocarbon fluid by the aqueous metal hydroxide solution migrate therefrom upon being mixed with the lean MOS medium whereby the lean MOS medium becomes fouled with the mercaptans directly extracted from the hydrocarbon fluid by the aqueous metal hydroxide solution and transferred from the fouled aqueous metal hydroxide solution to the lean MOS solution. In other words, the mercaptans are extracted from the hydrocarbon fluid directly by the alkali metal hydroxide solution and indirectly by the MOS phase. In other words, this is typical of the indirect extraction of mercaptans from hydrocarbon fluid by the MOS phase.

The mercaptans contained in hydrocarbon fluid can be extracted directly and indirectly simultaneously by the use of a heterogeneous two-phase extracting medium. That is to say, a mixture of alkali metal hydroxide, alkali metal salt of a solutizer and water which has a composition represented by a point to the right of the phase boundary line of a ternary diagram for the system which forms two immiscible phases, i. e., a MOS phase and a MOH phase can be used as a two-phase treating agent. That is to say, a hydrocarbon fluid containing mercaptans is contacted with a two-phase treating agent. The alkali metal hydroxide phase extracts primarily the C–4 and lighter mercaptans while the MOS phase extracts the C–5 and higher mercaptans directly. However, through contact of the MOS with the MOH phase the mercaptans extracted by the MOH phase substantially immediately migrate to the MOS phase. Thus, there is extraction of the C–5 and higher mercaptans directly by the MOS phase and extraction of the C–4 and lighter mercaptans indirectly by the MOS phase.

Another example of the direct and indirect extraction of mercaptans with the MOS phase is that operation in which one hydrocarbon fluid is contacted with a lean MOH phase, another hydrocarbon fluid is contacted with a lean MOS phase, the treated hydrocarbon fluids are separated from the respective MOS and MOH phases, and the fouled MOH phase mixed with the fouled MOS phase. Here again the mercaptans in the fouled MOH phase migrate to the fouled MOS phase and we have extraction of mercaptans directly and indirectly with the MOS phase. Thus, for example, referring to Figure 3 a solution having a composition represented by a point on line KL will separate into two phases. The MOS phase, i. e., the potassium hydroxide-potassium cresylate-water phase will have a composition represented by point K on the ternary diagram. The aqueous potassium hydroxide phase (MOH phase) will have a composition represented by the point L on the ternary diagram. The potassium hydroxide-potassium cresylate-water phase will contain about 64 percent potassium cresylate, about 23 percent water and about 13 percent potassium hydroxide and will be in equilibrium with a KOH phase containing about 54 percent KOH and 46 percent water. A hydrocarbon fluid, for example, a straight run gasoline, is contacted with the aforesaid MOR phase to obtain a treated gasoline and a fouled MOR phase. The treated gasoline is separated from the fouled MOR phase. The fouled MOR phase is then diluted with at least an equal amount of water and the solution steamed to hydrolyze the mercaptides to mercaptans and volatilize the mercaptans. This produces a dilute lean KOR phase which is then concentrated and is ready for use to extract more mercaptans. This is illustrative of the direct extraction of mercaptans with a MOS phase. Illustrative of the indirect extraction of mercaptans with a MOS phase is the use of the aforesaid KOH phase as an extracting medium. Thus, for example, a cracked gasoline is contacted with a KOH solution containing about 54 percent potassium hydroxide to produce treated gasoline and fouled KOH solution. The treated gasoline is separated from the fouled KOH solution and the fouled KOH solution intimately mixed with lean KOR solution, i. e., the aforesaid KOR solution containing 64 weight percent potassium cresylate, 13 weight percent potassium hydroxide and 23 percent water. The mercaptans present in the fouled KOH solution migrate to the lean KOR solution. The KOR solution and the KOH solution being substantially immiscible the fouled KOR solution is separated from the regenerated or lean KOH phase. The separated lean KOH phase is then used to extract more mercaptans from the cracked gasoline. The KOR phase is diluted with at least an equal volume of water and steam stripped to remove the mercaptans. Upon concentration of the lean KOR phase the lean KOR phase is ready again to remove mercaptans from a fouled KOH phase. This is illustrative of the indirect extraction of mercaptans with a MOS phase.

Illustrative of the substantially simultaneous direct and indirect extraction of mercaptans by a MOS phase is the extraction of mercaptans from a straight run gasoline employing a two-phase heterogeneous treating medium such as one having a composition represented by point A on the ternary diagram Figure 5. Such a two-phase treating medium contains about 19 percent potassium cresylate, about 44 percent potassium hydroxide and about 37 percent water. The straight run gasoline is contacted with the two-phase treating agent whereby the KOH phase directly extracts the light mercaptans and the KOR phase directly extracts the heavy mercaptans. Since the KOR phase and the KOH phase are in intimate contact the mercaptans extracted by the KOH phase practically immediately migrate to the KOR phase. The treated gasoline is separated from the two-phase treating medium and the two-phase treating medium is permitted to separate into a fouled KOR phase and a lean KOH phase. The fouled KOR phase is separated from the lean KOH phase, stripped of the mercaptans in the conventional manner, and mixed with the lean KOH phase to provide a lean two-phase treating medium comprising the lean KOR phase and the lean KOH phase. In further illustration of indirect extraction of mercaptans with a MOS phase is the extraction of mercaptans from cracked gasoline with a lean KOH phase and extraction of mercaptans from a straight run gasoline with a lean KOR phase. Thus, for example, a mixture having a composition represented by point A on the ternary diagram Figure 5 is separated into a lean KOR phase having a composition represented by the point on the solubility line bearing the legend KOR and a KOH phase having a composition represented by a point on the ternary diagram Figure 5 bearing the legend KOH. The cracked gasoline is contacted with the lean KOH phase to obtain a treated cracked gasoline and a fouled KOH phase. The fouled KOH phase is separated from the treated cracked gasoline. A straight run gasoline is contacted with the lean KOR phase to obtain a treated straight run gasoline and a fouled KOR phase. The treated straight run gasoline is separated from the fouled KOR phase. The fouled KOH phase and the fouled KOR phase are then mixed with the result that the mercaptans in the KOH phase migrate to the KOR phase. The fouled KOR phase is regenerated by steam stripping and the lean KOR phase is then ready for use in the treatment of further amounts of straight run gasoline. The lean KOH phase resulting from the intimate mixing of the fouled KOH phase with the fouled KOR phase upon separation from the fouled KOR phase is ready for use in the extraction of mercaptans from cracked gasoline. Thus, this is illustrative of the direct extraction of mercaptans by the lean KOR phase and the indirect extraction of mercaptans by the lean KOR phase.

Those skilled in the art will appreciate that the phase boundary line or the solubility limit line in the ternary diagrams for the system potassium hydroxide-potassium cresylate-water shifts somewhat with temperature. Consequently, compositions given hereinbefore for the two-phase mixture and for the KOR and KOH phases will change with a change in temperature to some extent. It also will be recognized by those skilled in the art that there are differences in the position of the phase boundary line or solubility line arising entirely from the basis for the preparation of the graph. That is to say, if the ternary diagram expresses the composition in terms of the concentration of solutizer rather than in terms of the concentration of solutizer salt cursory examination will lead to a conclusion that there is a discrepancy which does not actually exist.

The foregoing detailed discussion of the system potassium hydroxide-potassium cresylate-water and the use of that system in the removal of mercaptans is merely illustrative of one segment of the present invention. Other ternary systems in which the alkyl phenols (cresols) are replaced by other solutizers and consequently alkyl phenolates (cresylates) are replaced by other solutizer salts exhibit the same phenomena. However, ternary systems of other solutizers exhibit a phenomenon not exhibited by the alkali metal hydroxide-alkali metal alkyl phenolate-water system. That is to say, that while both phases of the cresylate system remain liquid at usual treating temperatures of 80° to 100° F., the alkali metal salt phase of other systems tends to solidify instead of remaining liquid at usual extracting temperatures of 80° to 100° F. Consequently, for practical purposes the ternary system is converted to a quaternary system in which the salt phase is liquid at extraction temperatures by the introduction into the ternary system of a liquefier or co-solvent such as lower alcohols, i. e., aliphatic alcohols having not more than 5 carbon atoms in the molecule in amounts sufficient to maintain the alkali metal salt phase liquid at temperatures of 80° to about 150° F., water-soluble ketones such as acetone and the like and cresylates such as the alkali metal salts of the phenolic and/or acidic organic material present in petroleum oil fractions for example, straight run or cracked naphthas, gas oils, fuel oils can also be used as liquefiers or co-solvents.

Typical of the application of this invention to one of the traditional solutizers is the ternary system, potassium isobutyrate-potassium hydroxide-water. The ternary diagram, Figure 6, shows the areas of single-phase and two-phase systems formed by different concentrations of the three components of the system.

In a three component system of water-potassium hydroxide-potassium isobutyrate, i. e., an alkali metal salt of a lower fatty acid, those mixtures represented by the area to the left of the line bearing the legend "Phase boundary line" form single-phase homogeneous systems while those mixtures represented by the area to the right of the aforesaid "Phase boundary line" are two-phase heterogeneous systems. However, it has been found that when the concentration of alkali metal hydroxide is greater than about 40 percent and the alkali metal isobutyrate concentration is greater than about 5 percent, the alkali metal salt phase is solid i. e., non-liquid at temperatures below about 100° F. Consequently, it is necessary to have a co-solvent or liquefier present such as an alkali metal salt of alkyl phenols, i. e., cresylates, lower aliphatic alcohols, lower ketones, etc.

The addition of such a co-solvent or liquefier shifts the phase boundary line to the right on the ternary diagram as indicated by "Phase boundary lines" GE and HF. Thus, for example, for the system potassium isobutyrate-potassium hydroxide-water using potassium cresylate as the co-solvent or liquefier, when the ratio of potassium isobutyrate to potassium cresylate is 0.33, the mixtures represented by the area to the left of phase boundary line GE are single-phase homogeneous systems, while the mixtures represented by the area to the right of phase boundary line GE are two-phase heterogeneous systems. Similarly, the area to the left of phase boundary line HF representing a potassium isobutyrate-to-potassium cresylate ratio of 0.67 is that of mixtures forming single-phase homogeneous systems while the area to the right of phase boundary line HF represents mixtures forming two-phase heterogeneous systems. The tie lines JK, LM and NP tie together the points J, L and N representing the compositions of the upper phases with the points K, M, and P representing the compositions of the lower phases.

In accordance with the foregoing, extraction of mercaptans from water-immiscible liquids such as petroleum naphthas and regeneration of the extracting solution can be accomplished in the two-phase area of the ternary-quaternary diagram, Figure 6, with mixtures containing at least 40 percent KOH—5 to 100 percent potassium isobutyrate and the balance water with the reservation that when the potash concentration is about 43 percent and the potassium isobutyrate concentration is greater than about 3 percent, sufficient potassium alkyl phenolate, i. e., cresylate, is present that the ratio of potassium isobutyrate to potassium cresylate shall be 0.33. Thus, useful solutions are those, for example, containing 25 percent KOH, 35 percent KI (potassium isobutyrate) balance, 40 percent, water; or 25 percent KOH, 40 percent KI—KCr (potassium cresylate) in which the ratio of KI to KCr is 0.33 and the balance, 35 percent, water; or 19 percent KOH, 60 percent KI—KCr in which the ratio of KI to KCr is 0.67 and the balance, 21 percent, water.

Referring now to Figures 7, 8 and 9 which represent a new concept, to wit: that mercaptides i. e., the alkali metal salts of the mercaptans, are themselves solutizers. It is to be noted that in selecting a mercaptide for use as a solutizer that the capability of the mercapitude to act as a solutizer is greater the closer the molecular weight of the solutizer-mercaptide and the extracted mercaptan. Thus, for cracked gasolines containing a high proportion of ethyl and methyl mercaptans, alkali metal methyl and/or ethyl mercaptide is preferred, alkali metal butyl mercaptide can be used for both cracked and straight, and alkali metal hexyl mercaptide can be used in treating straight run gasoline with greater efficacy than in treating cracked gasolines.

Referring now to Figure 7. It will be noted that the ternary system potassium methyl mercaptide-potassium hydroxide-water forms a series of mixtures which are single-phase homogeneous systems and a series of mixtures which are two-phase heterogeneous systems. The compositions of the homogeneous systems are represented by the points in the area to the left of the line bearing the legend "phase boundary line," while the compositions of the two-phase heterogeneous systems are represented by the points in the area to the right of the aforesaid line bearing the legend "Phase boundary line."

This system likewise is characterized by freezing of the upper alkali mercaptide layer when the composition of the mixture is that of a point to the right of the phase boundary line. Accordingly, as with the potassium isobutyrate system discussed hereinbefore, it is desirable to add a co-solvent to the mixture. Suitable co-solvents or liquefiers are as stated before, aliphatic alcohols having 1–5 carbon atoms in the molecule, lower water miscible ketones and the like and alkali metal salts of alkyl phenols. Because of accessibility and ease of preparation as well as low cost, it is preferred to use the alkali metal salts of the phenolic or acidic organic materials present in various fractions of petroleum oil as the co-solvent or liquefier. Accordingly, sufficient alkali metal alkyl phenolate is added to the mixture to ensure that the mercaptide layer shall be fluid. Thus, for example, sufficient alkali metal alkyl phenolate (alkali metal cresylate) can be added to the alkali metal mercaptide-alkali metal hydroxide-water mixture that the mixture of alkali metal mercaptide and alkali metal cresylate is fluid or the amount of alkali metal cresylate added to the mixture can be such as to make the ratio of alkali metal mercaptide to alkali metal cresylate about 0.1 to about 0.2. In other words, the mixture can be one in which the solutizer is predominantly alkali metal mercaptide or alkali metal cresylate or a mixture of the two in which both mercaptide and cresylate are present in equal amounts.

It will be noted that at a potassium methyl mercaptide to potassium cresylate ratio of 0.1 the phase boundary line shifts to the right, and when the ratio is 0.2, the boundary line between the homogeneous single-phase system and the heterogeneous two-phase system is shifted still further to the right as represented by lines GE and HF, respectively.

The tie line JK joins the points which represent respectively the compositions of the upper and lower phases. Thus, when using a mixture containing more than 10 percent potassium hydroxide, more than 2 percent of a mixture of potassium methyl mercaptide and potassium cresylate in which the ratio of mercaptide to cresylate is 0.2 and the balance water, the upper layer will have a composition, for example, corresponding to point J and the lower layer a composition corresponding to point K, or respectively 24 percent KOH, 45 percent

$KCH_3S$—$KCr(KCH_3S:KCr=0.2)$ and the balance water for the upper layer and 49 percent KOH, 2 percent $KCH_3S$—$KCr$ and the balance water.

Referring now to Figure 8 wherein the ternary system $KC_4H_9S$—KOH-water and the quaternary system $KC_4H_9S$—KCr—KOH-water are represented, it will be observed that this system is quite analogous to the systems discussed hereinbefore. Thus, "Phase boundary line" CD represents the compositions of the various mixtures which show the formation of two phases. It will also be noted that when sufficient of a co-solvent or liquefier such as potassium cresylate is added to the ternary system that the ratio of potassium butyl mercaptide $KC_4H_9S$:KOH is 0.1 the phase boundary line shifts to the right to the line CE and that when the ratio of potassium butyl mercaptide to potassium cresylate is 0.2, the phase boundary line is shifted to the position CF. Accordingly, a ternary system of $KC_4H_9S$—KOH-water, or the same system to which potassium cresylate is added in amounts up to such that in the resulting mixture the ratio of $KC_4H_9S$ to KCr is 0.1, can be used.

It will be noted that the relationships plotted in Figures 6, 7, 8 and 9 are those existing at 90° F. when the temperature of the mixtures is raised above 90° F. the "Phase boundary lines" CD shift to the right. Consequently, at temperatures above 90° F. the need for a co-solvent or liquefier is not as great as at 90° F. Accordingly, it is not necessary to add a co-solvent at as low a concentration at temperatures above 90° F. as at concentrations represented by line CD. Similarly, tie line JK joins the points J and K representing respectively the compositions of the upper and lower layers. Thus, point J represents an upper layer containing 28 percent KOH, 39 percent of a mixture of $KC_4H_9S$—KCr having a $KC_4H_9S$:KCr ratio of 0.2 and 33 percent water in contact with a lower layer containing 49 percent KOH, 1.5 percent $KC_4H_9S$—KCr having a $KC_4H_9S$:KCr ratio of 0.2 and the balance, 49.5 percent, water.

Referring now to Figure 9. It will be observed that the ternary system KOH—$KC_6H_{11}S$-water forms a series of homogeneous single phase mixtures and a series of heterogeneous two-phase mixtures. The phase boundary line for the ternary system at 90° F. is the line CD. For the quaternary system KOH—$KC_6H_{11}S$—KCr-water at a $KC_6H_{11}S$:KCr ratio of 0.1 the phase boundary line is CE and for the quaternary system in which the ratio of $KC_6H_{11}S$:KCr is 0.2 the phase boundary line is CF. The areas to the left of each phase boundary line represent the compositions of homogeneous mixtures of KOH—KC$_6$H$_{11}$S—water of KOH—KC$_6$H$_{11}$S—KCr-water while the areas to the right of each phase boundary line represent the compositions of heterogeneous two-phase mixtures. The tie line JK joins the points J and K representing respectively the compositions of the upper and lower layers. Thus, point J represents an upper layer containing 24 percent KOH, 47 percent of a mixture of KC$_6$H$_{11}$S and KCr in which the KC$_6$H$_{11}$S:KCr ratio is 0.2 and the balance, 29 percent, water in contact with a lower layer containing 51 percent KOH, and the balance water.

In the application of the principles of the present invention to the use of water-sodium hydroxide-alkyl phenol (cresol) mixtures, it is to be noted that satisfactory separation into two phases has been secured when the upper phase comprising water-sodium hydroxide-sodium alkyl phenolate (cresylate) and the lower phase comprising sodium hydroxide and water had the compositions given in Table I.

*Table I*

| Composition | Equilibrium A | | Equilibrium B | | Equilibrium C | |
|---|---|---|---|---|---|---|
| | Top layer | Bottom layer | Top layer | Bottom layer | Top layer | Bottom layer |
| Alkyl phenols, weight percent | 7 | | 15 | | 20 | |
| NaOH, weight percent | 48 | 53 | 45 | 56 | 43 | 59 |
| Water, weight percent | 45 | 47 | 40 | 44 | 37 | 41 |

Since, in accordance with the principles of the present invention, the ultimate destination of the extracted mercaptans is the solutizer salt phase regardless of the composition of the extracting medium, in general only the solutizer salt phase is regenerated. Regeneration of the solutizer salt (MOS) phase by steam stripping is preferred when the MOS phase tends to produce acidic oxidation products under conditions required to oxidize the mercaptides contained in the MOS phase to polysulfides. Such MOS phases, for example, are those containing as solutizer salts, cresylates and/or mercaptides. When MOS phase mixtures are regenerated by oxidation of the mercaptides the concentration of free alkali metal hydroxide is reduced and the regenerated solution must be fortified with free alkali metal hydroxide to a greater extent than when such MOS phase mixtures are regenerated by steam stripping. Accordingly, regeneration of the MOS phase mixtures can be either by steam stripping or oxidation in the presence or absence of an oxidation promoter known to those skilled in the art.

It follows from the foregoing discusison that it is an object of the present invention to remove acidic organic material from hydrocarbon fluids directly or indirectly with a liquid mixture of alkali metal hydroxide, an alkali metal salt of an organic material which increases the solubility of the aforesaid acidic organic material in the liquid mixture and water. It is another object of the present invention to remove mercaptans from hydrocarbon fluids directly or indirectly with a liquid mixture of alkali metal hydroxide, alkali metal salt of a solutizer for mercaptans and water which liquid mixture is substantially immiscible with aqueous solution of said alkali metal hydroxide at temperatures of about 60° to about 140° F. It is a further object of the present invention to remove mercaptans from hydrocarbon fluids directly or indirectly with a liquid mixture of alkali metal hydroxide, alkali metal salt of a solutizer for mercaptans and a co-solvent selected from the group consisting of alcohols having 1 to 5 carbon atoms per molecule, water miscible ketones and alkali metal salts of alkyl phenols in amounts sufficient to make the aforesaid liquid mixture liquid at the extraction temperature. It presently is an especial object of the present invention to extract mercaptans from hydrocarbons fluids directly or indirectly with a mixtures of potassium hydroxide, potassium alkyl phenolates (potassium cresylates) and water liquid at the mercaptan extraction temperature; or a mixture of potassium hydroxide, potassium isobutyrate and water containing an amount of potassium cresylate sufficient to maintain the mixture liquid at the mercaptan extraction temperature; a mixture of potassium hydroxide, potassium salt of an aliphatic mercaptan having 1 to 6 carbon atoms and water containing an amount of a co-solvent sufficient to maintain the mixture liquid at the cercaptan extraction temperature.

Figure 1 is a ternary diagram for the system water-potassium hydroxide-potassium salts of the alkyl phenols present in petroleum fractions having a boiling range of about 200° F. to about 650° F. at 90° F. upon which has been indicated by a cross-hatched area the prior art 5 normal KOH—2 normal potassium alkyl phenolate to 6 normal KOH—3 normal potassium alkyl phenolate (5 N KOH—2 N KAP to 6 N KOH—3 N KAP) treating solutions;

Figure 2 is the ternary diagram of Figure 1 upon which has been drawn a family of curves representing the compositions of mixtures of the three components of the system which are in equilibrium with mixtures of hydrocarbons containing the parts of alkyl phenols per million parts of oil indicated by the legend on each curve;

Figure 3 is the ternary diagram of Figure 1 upon which has been drawn two families of curves; the family of curves drawn with discontinuous lines representing the composition of mixtures of water, potassium hydroxide and potassium salts of the aforesaid alkyl phenols having the same viscosity expressed as centistokes and the family of curves drawn with continuous lines representing the compositions of mixtures of water, potassium hydroxide and potassium salts of the aforesaid alkyl phenols having equivalent mercaptan extraction power;

Figure 11 is a simplified schematic flow sheet illustrating one means of directly extracting mercaptans from gasoline in a cyclic manner;

Figure 12 is a schematic flow sheet of one means of carrying out the present invention;

Figure 13 is a schematic flow sheet of a second means of carrying out the present invention;

Figure 14 is a highly schematic illustration of the application of the principles of the present invention to the sweetening of three petroleum fractions;

Figure 15 is a highly schematic illustration of the principles of the present invention in the use of a heterogeneous, two-phase aqueous mixture of alkali metal hydroxide and alkali metal alkyl phenolates (cresylates) for the sweetening of a petroleum fraction;

Figure 16 is a schematic illustration of the principles of the present invention in the use of either a heterogeneous, two-phase treating mixture or an aqueous alkali metal alkyl phenolate (cresylate) mixture for the removal of mercaptans from a mixture of hydrocarbons.

Figure 1:
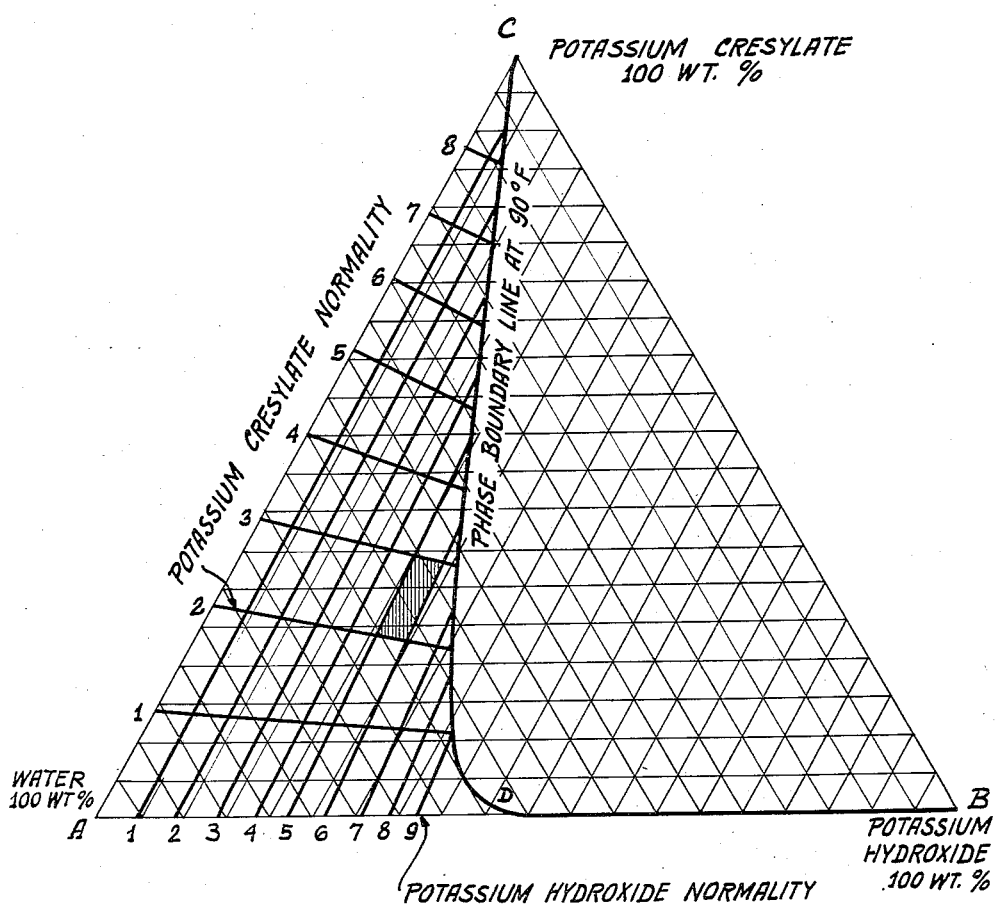
Figure 2:
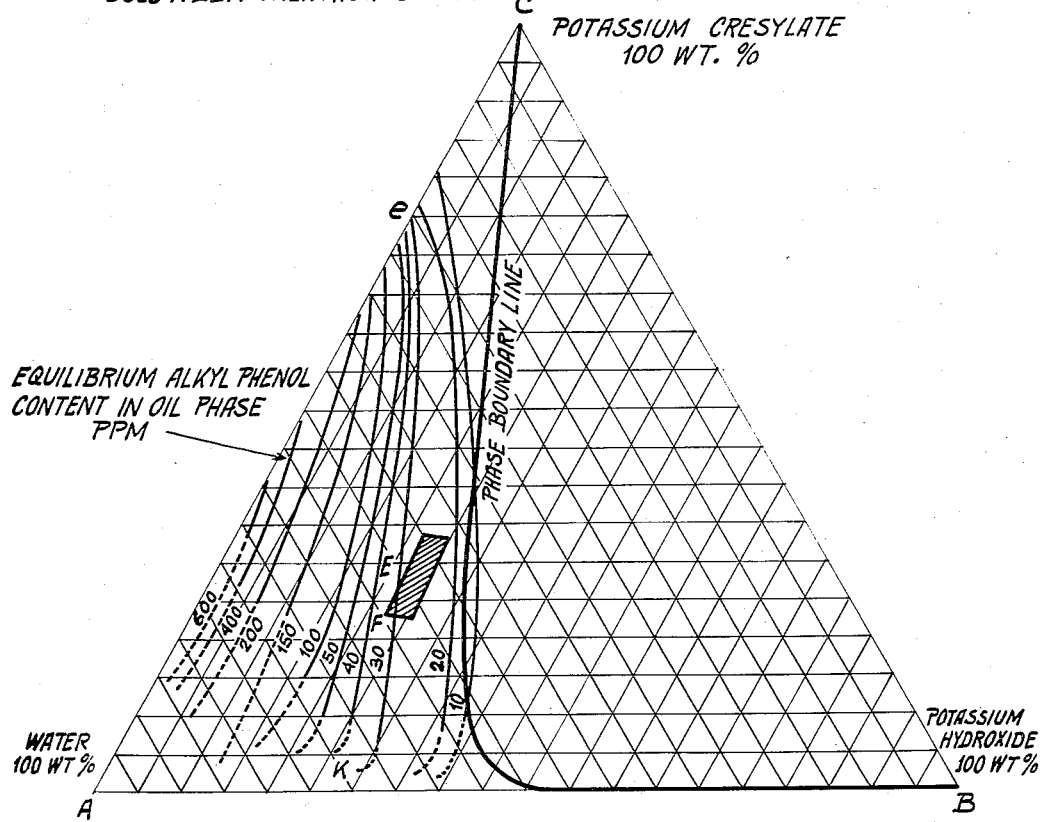

Generally, the present invention involves the use of aqueous treating solutions of such concentrations of free or uncombined alkali metal hydroxide and solutizer or solutizer and liquefier that two fluid aqueous phases exist at temperatures of 60–140° F. preferably at temperatures of 80° to 100° F. i. e., mercaptan extraction temperatures. Specifically, the present invention involves the use of treating solutions of such concentrations of free or uncombined alkali metal hydroxide and alkali metal alkyl phenolates (cresylates) that two aqueous phases exist at the mercaptan extraction temperatures. The present invention also contemplates the use of liquid mixtures of alkali metal alkyl phenolates (cresylates) and at least one of the solutizers alkali metal salt of a lower fatty acid and alkali metal salt of an aliphatic mercaptan having 1 to 6 carbon atoms and alkali metal hydroxide in which the concentrations of free or uncombined alkali metal hydroxide and alkali salts of solutizer and alkali metal cresylates are such that two aqueous fluid phases exist at the mercaptan extraction temperature and in which the ratio of alkali metal salt of a lower fatty acid or of an aliphatic mercaptan to alkali metal cresylate is from $$\frac{1}{0} \text{ to } \frac{0}{1}$$

For brevity and clarity of description, the present invention will be described and discussed in terms of alkyl phenolates (cresylates) but it is to be understood that the use of the words "alkyl phenolates" or "cresylates" is not exclusive of the other solutizers known to the art or of the aliphatic mercaptide solutizers described hereinbefore. In other words, the description given hereinafter of the application of the principles of the present invention while in the terms of the use of a liquid mixture containing free alkali metal hydroxide, alkali metal alkylphenolates (cresylates) and water directly or indirectly for the removal of mercaptans from hydrocarbon fluids, it is also a description of the use of known solutizers such as alkali metal salts of the lower fatty acids and the novel aliphatic mercaptide solutizers alone or in conjunction with co-solvents or liquefiers such as the aliphatic alcohols having 1 to 6 carbon atoms or the water-miscible aliphatic ketones and the like but also of the use of the foregoing solutizers in conjunction with the alkali metal cresylates.

The application of the principles of the present invention can be divided into three major embodiments, to wit: the direct extraction of mercaptans from hydrocarbon fluids with the MOS phase; the indirect extraction of mercaptans from hydrocarbon fluids in which direct extraction of the mercaptans with the MOH phase occurs first and the mercaptides are extracted from the MOH phase by contact with the MOS phase; and the direct and indirect extraction of mercaptans from hydrocarbon fluids wherein the MOS phase is used to extract directly mercaptans and the MOH phase is used to directly extract mercaptans and the mercaptides in the MOH phase are extracted therefrom with the MOS phase which contains mercaptides extracted from the hydrocarbon fluid by the MOS phase. In this latter embodiment of the present invention the direct and indirect extraction of the mercaptans can occur substantially simultaneously from the same hydrocarbon fluid or the MOH phase can be used to extract mercaptans from one hydrocarbon fluid, for example, a cracked naphtha, while the MOS phase is used to extract mercaptans from another hydrocarbon fluid, for example, a straight run naphtha and then through contact of the fouled MOH phase with the fouled MOS phase the mercaptides of the fouled MOH phase transferred to the fouled MOS phase.

Figure 5:
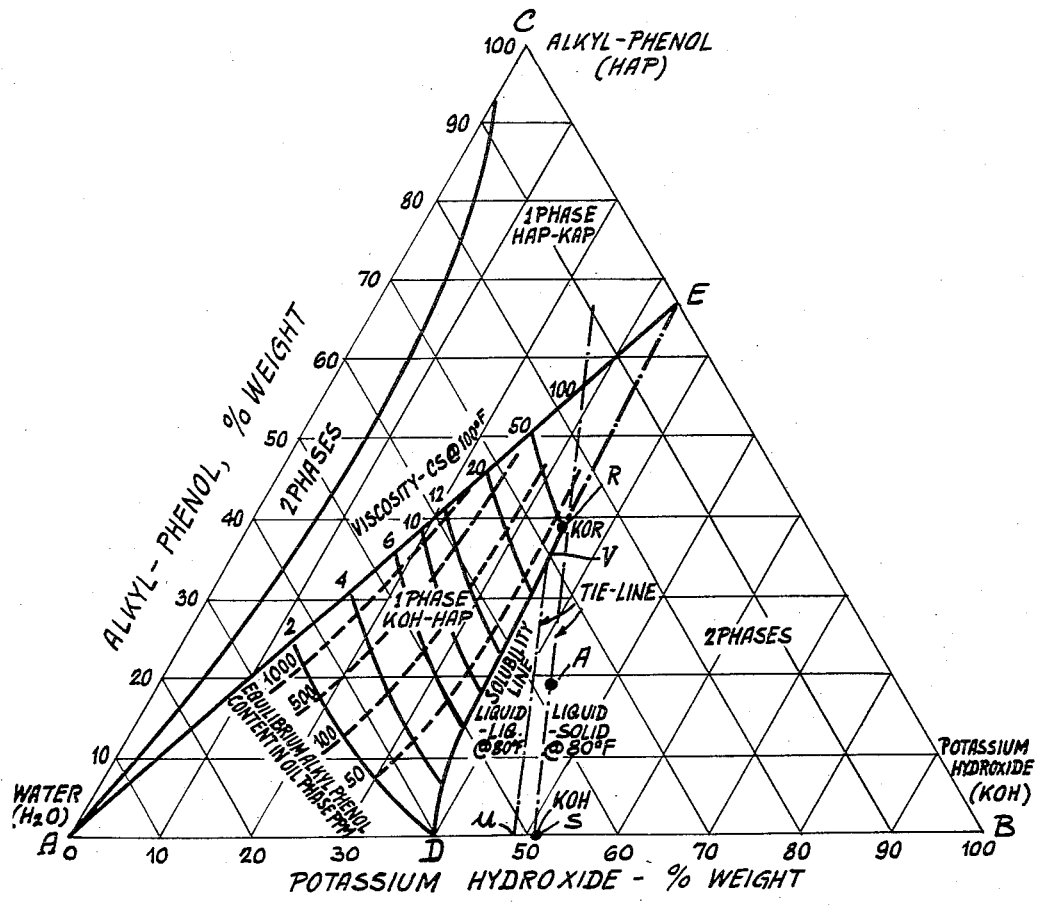
Figure 5 is a ternary diagram for the system potassium hydroxide, potassium alkyl phenolate and water at 80° F. using the weight percent concentration of alkyl phenols (cresols) of potassium hydroxide, and of water as the basis for preparing the diagram.

For simplicity and for illustrative purposes the use of liquid potassium hydroxide-potassium cresylate-water (KOR) mixtures for direct and indirect removal of mercaptans from gasoline will be described. Thus, for treatment of a straight run naphtha at a mercaptan extraction temperature of 80° F. a KOR mixture is selected which will be immiscible with an aqueous KOH solution at 80° F. Turning to Figure 5 we find that a KOR phase represented by the point on the solubility line bearing the legend V is in equilibrium with a KOH phase represented by a point on the base of the triangle bearing the legend U. Such a KOR phase has the following composition: 35 weight percent KOH, 35 weight percent cresols and 30 weight percent water. This KOR phase is in equilibrium and substantially immiscible at 80° F. with a KOH phase having the following composition: 49 weight percent KOH and 51 weight percent water. Accordingly, a straight run gasoline or a cracked gasoline is contacted with the aforesaid liquid KOR mixture at 80° F. to extract mercaptans from the gasoline to provide a treated gasoline of materially reduced mercaptan content and to produce a fouled KOR phase containing extracted mercaptans. The treated gasoline is separated from the fouled KOR phase or treating medium, washed with water to remove treating medium, and residual water removed from the washed gasoline. The fouled KOR treating medium is diluted with at least an equal weight of water and heated to hydrolyze the contained mercaptides to mercaptans and to volatilize the mercaptans. The KOR treating medium so regenerated with respect to mercaptides (mercaptans) is contacted with a KOH solution with which it is substantially immiscible. Since the temperature selected is 80° F. the KOH solution is one containing at least 49 weight percent KOH balance, to make 100 weight percent, water. This fortifies the KOR treating medium and restores the free KOH bringing the regenerated KOR treating medium to preferred strength with respect to the concentration of free KOH. The regenerated and fortified KOR treating medium is then separated from the KOH phase and the regenerated and fortified KOR treating medium returned to the extraction stage.

Illustrative of direct and indirect removal of mercaptans from a hydrocarbon fluid is the treatment of a straight run gasoline with a KOR treating medium and a complementary KOH phase. For example, straight run gasoline is contacted with a treating medium having the following composition: 30 weight percent potassium cresylate, 36 weight percent potassium hydroxide and 34 weight percent water represented by point T on tie-line KL to Figure 4. This treating medium at 90° F. separates into a KOR phase having the following composition and represented by point K on tie-line KL, 67 weight percent potassium cresylate, 13 weight percent KOH and 20 weight percent water and a KOH phase represented by point L on the base of the triangle and having the following composition: 54 weight percent KOH and 46 weight percent water. The straight run gasoline is contacted with the two-phase treating medium to produce a treated gasoline and a fouled two-phase treating medium. The treated gasoline is separated from the fouled two-phase treating medium, water washed and residual water removed. The fouled two-phase treating medium is settled at about 90° F. until an upper KOR phase and a lower KOH phase form. The KOR phase is separated from the KOH phase which contains not more than about 5 percent of the mercaptans extracted and consequently is regenerated and ready for re-use. The separated KOR phase is diluted, steamed to remove mercaptans, concentrated if necessary and mixed with the regenerated KOH phase to provide a regenerated two-phase treating medium. The regenerated two-phase treating medium is recycled to treat more of the straight run gasoline.

It will be noted that in this embodiment of the present invention the KOR phase is constantly fortified with respect to free KOH during extraction by continuous contact with the constantly regenerated KOH phase.

In general, it is usually not imperative to use a KOR treating medium to remove mercaptans from cracked gasoline. Generally, the KOH solutions with which KOR treating mediums are substantially immiscible having sufficient capability. Accordingly, a KOR treating medium can be used to indirectly remove mercaptans from cracked gasoline in the following manner.

Figure 4:
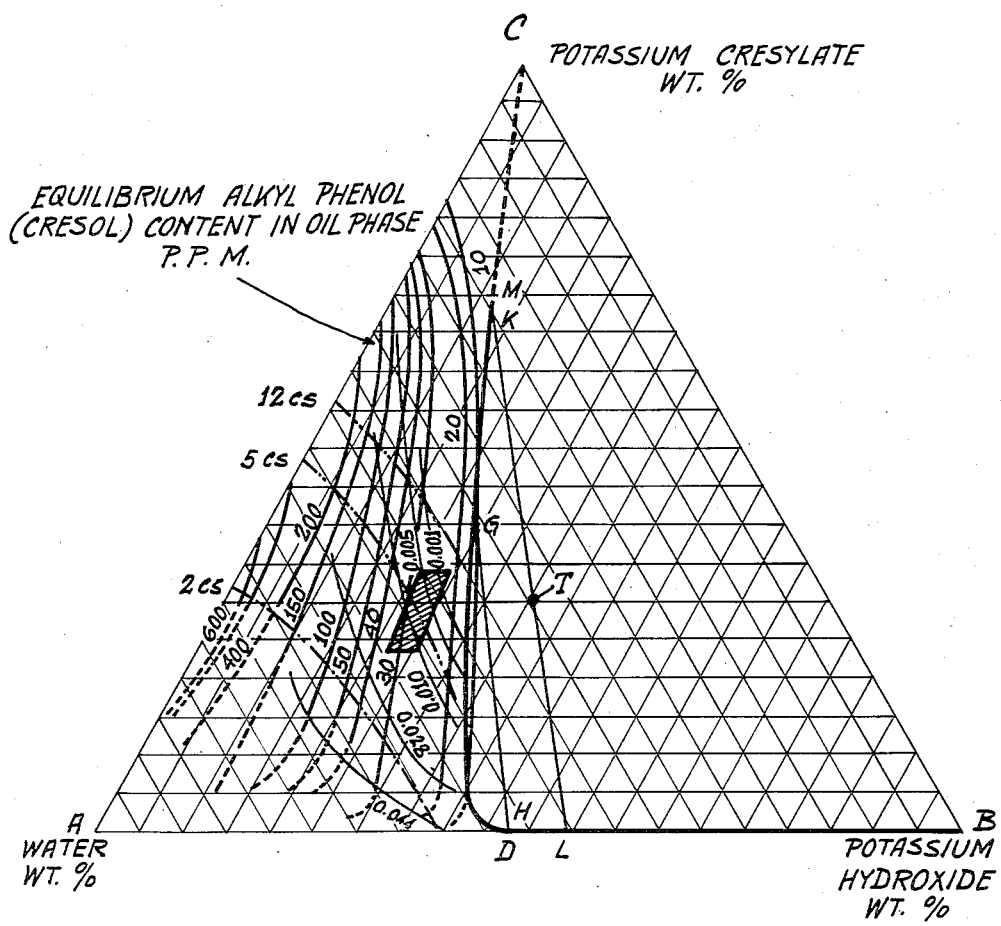
Figure 4 is the ternary diagram of Figure 1 upon which has been superposed the curves representing the data graphically presented in Figures 1, 2 and 3.

A cracked gasoline is contacted with an aqueous KOH treating medium represented by point D on the base base line of the triangle of Figure 4 and having the following composition: 47 weight percent KOH and 53 weight percent water. The treated gasoline of substantially reduced mercaptan content is separated from the KOH treating medium fouled with the mercaptans extracted from the cracked gasoline. The separated gasoline is water washed and residual water removed.

A straight run gasoline is treated with a KOR treating medium represented by point G on Figure 4 and having the following composition: 38 weight percent potassium cresylate, 24 weight percent KOH and 38 weight percent water. The treated gasoline is separated from the fouled KOR treating medium, water washed and residual water removed.

The fouled KOR treating medium is mixed with the fouled KOH treating medium, the resultant mixture allowed to separate into an upper KOR layer and a lower KOH phase. At least 95 percent of the mercaptans in the fouled KOH treating medium migrate to the fouled KOR treating medium regenerating the KOH treating medium which is recycled to the extraction stage. The KOR layer is separated from the regenerated KOH layer. The separated KOR layer is diluted and steamed to remove mercaptans and regenerate the KOR treating medium. The regenerated KOR treating medium is concentrated when necessary and is recycled to the extraction stage.

In general, KOH treating medium containing 37 to 60 weight percent potassium hydroxide, balance, to make 100 weight percent, water are substantially immiscible with KOR treating medium having compositions set forth in Table II.

*Table II*

|  | Weight percent | | |
| --- | --- | --- | --- |
| Alkyl phenol | 67 | 10 | 1 |
| KOH | 33 | 38 | 39 |
| H₂O |  | 52 | 60 |

Illustrative of the direct extraction of mercaptans from hydrocarbon fluids employing, as the MOS phase, a fluid treating medium comprising about 40 weight percent potassium salts of petroleum cresols boiling from 105° F. to 400° F., or 600° F., i. e., potassium cresylates designated hereinafter as KCr, about 23 weight percent potassium hydroxide and about 37 weight percent water is the treatment of West Texas sour gasoline as shown in the very schematic flow sheet Figure 11. The MOH phase is an aqueous solution of potassium hydroxide having the composition 50 weight percent potassium hydroxide (KOH) and 50 weight percent water.

As is evident to those skilled in the art, the process schematically illustrated in Figure 11 provides for prewashing the sour gasoline before treatment with the KOR treating medium for the direct removal of mercaptans.

In the prewash section an aqueous solution of sodium hydroxide of about 10°–15° Baumé is circulated through two prewash settlers by pump 250. Thus, a 10°–15° Baumé aqueous solution of sodium hydroxide is drawn from a source not shown through line 327 by pump 250. The discharge of pump 250 flows partly through line 251 to conduit 252 where it is mixed with sour gasoline flowing from a source not shown through pipe 263. The mixture of dilute aqueous sodium hydroxide and sour gasoline flows to mixer 253, thence through line 254 to settler 255. In settler 255 the gasoline from which hydrogen sulfide, alkyl phenols and other organic and inorganic materials more acid than mercaptans have been removed at least in part separates from the aqueous sodium hydroxide solution. The partially prewashed sour gasoline flows from settler 255 through pipe 264 to conduit 258. The dilute aqueous sodium hydroxide containing the sodium salts of hydrogen sulfide, alkyl phenols, etc. flows from settler 255 through line 256 to the suction side of pump 250.

A portion of the discharge of pump 250 flows via line 257 to conduit 258 and the second stage of the prewash. In conduit 258 the partially prewashed sour gasoline flowing from settler 255 through pipe 264 mixes with the dilute, i. e., 10°–15° Baumé aqueous sodium hydroxide solution and the mixture enters mixer 259. (Mixers 253 and 259 are of any suitable type such as orifice mixers.) From mixer 259 the sour gasoline and caustic soda solution flow to settler 261. In settler 261 the prewashed sour gasoline separates from the dilute caustic soda solution. The dilute caustic soda solution containing sodium salts of hydrogen sulfide, alkyl phenols and/or thiophenols flows from settler 261 through line 262 to the suction side of pump 250 to be recirculated through the prewash section until exhausted, i. e., until it can no longer remove hydrogen sulfide, phenols and other organic material more acidic than mercaptans from untreated gasoline in an industrially practical manner, at which time it is removed from the system and replaced with fresh 10°–15° Baumé aqueous caustic soda.

The prewashed gasoline flows from settler 261 through pipe 265 to coalescer 266. Such dilute caustic soda solution as is carried over from settler 261 is separated and is removed from time to time through line 270. The prewashed gasoline flows from coalescer 266 through line 267 to settler 268. Any caustic carry over from the coalescer separates in settler 268 and is removed through pipe 271. The prewashed sour gasoline leaves settler 268 through pipe 269 for treatment for the direct removal of mercaptans with MOS treating medium which for illustrative purposes is the KOR treating medium described hereinbefore and containing 40 weight percent KCr, 23 weight percent KOH and 37 weight percent water, or about 29.6 weight percent cresols, about 38.3 weight percent KOH and about 32.1 weight percent water.

The prewashed gasoline flows from settler 268 through pipe 269 to conduits 287 and 288. Fouled KOR treating medium flows from settler 281 and coalescer 325 of the second extraction stage to line 283 to pump 284. The discharge of pump 284 flows through line 285 to line 286 and thence to conduits 287 and 288 where the partially fouled KOR treating medium mixes with the prewashed sour gasoline. The mixture of gasoline and KOR treating medium flows through conduits 287 and 288 to mixers 289 and 290 respectively. Mixers 289 and 290 are of any suitable type whereby intimate mixing of the gasoline and treating medium is obtained. From mixers 289 and 290 the mixture of gasoline and KOR treating medium flows through conduits 291 and 292 respectively to conduit 293 and thence to first stage settler 294.

In first stage settler 294 the partially treated gasoline separates from the fat (fouled) KOR treating medium. The partially treated gasoline flows from settler 294 through pipe 323 to conduits 274 and 275. Lean (with respect to mercaptides or mercaptans), fortified (with respect to the concentration of free KOH) KOR treating medium flows from surge tank 274 through line 275 to the suction side of pump 276. The discharge of pump 276 flows through line 273 to conduits 274 and 275. In conduits 274 and 275 the lean KOR treating medium substantially devoid of mercaptides (salts of mercaptans) mixes with the partially treated gasoline from the first stage settler 294. The mixture of gasoline and the lean KOR treating medium flows through conduits 274 and 275 to mixers 276 and 277 respectively and thence through conduits 278 and 279 respectively to conduit 280.

The mixture of gasoline and KOR treating medium flows through conduit 280 to second stage settler 281. In second stage settler 281 treated gasoline separates from partially fouled KOR treating medium. The separated treated gasoline flows from settler 281 through pipe 324 to coalescer 325. In coalescer 325 entrained KOR treating medium separates from the treated gasoline.

Treated gasoline flows from coalescer 325 through pipe 326 to finishing and/or storage.

Returning to first settler 294 and following the course of the fat, i. e., fouled KOR treating medium. The fat KOR treating medium flows from settler 294 through line 295 to line 296 and the suction side of pump 297. Water for dilution is drawn from the top section of stripper 306 through line 328 in amount about equal to the volume of KOR treating medium. Thus, in treating 12,000 barrels per day of West Texas sour gasoline about 800 barrels per day of KOR treating medium are used. Accordingly, about 700 barrels per day of water of dilution are drawn through line 328 and mixed with the fouled KOR treating medium in line 296 and pump 297. The diluted fat KOR treating medium flows through line 298 to surge-tank separator 299.

In separator 299 gasoline entrained in the fouled KOR treating medium separates. The gasoline amounts to about 20 barrels per day. The recovered gasoline flows from separator 299 through pipe 329 to conduit 288 of the first extraction stage.

The dilute fouled KOR treating medium flows from separator 299 through line 300 to line 301 and thence to the suction side of pump 302. Pump 302 discharges the dilute fat KOR treating medium into line 303 through which the dilute fat treating medium flows to heat exchanger 304 and thence through line 305 to mercaptide hydrolyzer and stripper 306.

The dilute fat treating medium is heated in stripper 306 to a temperature at which the mercaptides in the fat treating medium are hydrolyzed to mercaptans and the so-formed mercaptans together with the water of dilution and reaction volatilized and withdrawn overhead through pipe 307. The overhead vapors flow through pipe 307 to condenser 308 and thence through pipe 309 to stripper overhead accumulator 310.

In accumulator 310 the uncondensed mercaptans separate from the condensed water and flow through pipe 311 to recovery or the refinery fuel line.

The condensed water flows from accumulator 310 through pipe 312 to the suction side of pump 313. The discharge of pump 313 flows through pipe 314 to stripper 306 as reflux.

The demercaptanized KOR, i. e., lean KOR (lean with respect to mercaptans and of somewhat reduced concentration of KOH) flows from stripper 306 through line 315 to line 317 and the suction side of pump 318. In line 317 the lean KOR is mixed with strong KOH, i. e., having a concentration of at least about 40 weight percent KOH preferably about 55 weight percent KOH at a temperature at which the lean KOR and the strong KOH are mutually substantially immiscible, say 90° F. The mixture of lean KOR and strong KOH solution is discharged by pump 318 into line 319 through which it flows to KOR separator 320.

In KOR separator 320 the lean KOR fortified by the KOH transferred from the strong KOH solution separates from the mixture. The fortified, (fortified in that the concentration of free KOH has been restored to about 23 weight percent) lean, (i. e., substantially devoid of mercaptides) KOR flows from KOR separator 320 through line 322 to surge tank 294.

The strong aqueous KOH solution which separates from the fortified lean KOR treating medium in settler 320 flows through line 321 to line 317 to be mixed with lean KOR treating medium in line 317 and the mixture returned to KOR separator 320. From time to time as the concentration of potassium hydroxide (KOH) falls below that concentration necessary to fortify the lean KOR treating medium, fresh strong KOH having a concentration of KOH in sufficient excess of that of the circulating KOH solution to raise the concentration of KOH in the circulating KOH solution to the original value is drawn from a source not shown through line 316 and flows therethrough into line 321. In other words, the amount of KOH transferred from the KOH solution to the KOR treating medium is replaced by fresh KOH.

The extraction temperature at which the mercaptans are extracted directly from the hydrocarbon fluid is about 60° F. to about 140° F. The temperature at which the lean KOR treating medium is fortified is about 60° F. to about 140° F. The concentration of KOH for fortifying the lean KOR treating medium must be greater than the KOH concentration of the KOR treating medium originally and complement the composition of the lean KOR treating medium so that the lean, fortified KOR treating medium is substantially immiscible with the aqueous KOH solution.

The indirect extraction of mercaptans from hydrocarbon fluids with MOS treating medium is illustrated by the direct extraction of mercaptans from cracked gasoline with MOH solution and extraction of the mercaptans (mercaptides) from the MOH solution with an MOS treating medium. For example, a cracked gasoline containing primarily $C_1$ to $C_4$ mercaptans can be extracted with an aqueous potassium hydroxide solution containing about 37 to about 60 weight percent potassium hydroxide until fouled with mercaptides. The fouled KOH solution is then regenerated by mixing it with a liquid mixture containing about 1 to about 67 weight percent alkyl-phenols (cresols), and 39 to about 33 weight percent potassium hydroxide, and the balance, to make 100 weight percent, water. The two phases (KOR phase and KOH phase) are kept in contact at a temperature of at least about 60° F. until substantially all of the mercaptides in the potassium hydroxide solution (MOH phase) have migrated to the potassium alkyl phenolate-potassium hydroxide (KOR) phase. The two phases are then separated to provide a regenerated KOH phase and a fouled KOR phase. The KOR phase is then regenerated preferably by steaming.

Thus, for example, referring to Figure 12, a raw petroleum fraction such as a cracked gasoline containing substantially only $C_1$ to $C_4$ mercaptans is introduced through line 7 into an extracting column 1 comprising a shell 2, a motor 3 and a shaft 4 with arms 5 constructed and arranged to provide intimate contact between the extracting medium and the oil to be treated. Column 1 is also provided with alternating extracting zones or stages 29 and settling stages 6 loosely packed with a material such as steel wool. The oil to be treated, cracked gasoline containing substantially only $C_1$ to $C_4$ mercaptans for the purpose of this illustration of the principles of the present invention, is introduced into column 1 in the region of the bottom thereof while an aqueous solution containing about 37 to about 60 weight percent of potassium hydroxide is introduced into column 1 through pipe 17 in the last extraction stage.

The gasoline rises upwardly through the descending KOH solution and leaves the column as demercaptanized gasoline through line 8. During contact with the gasoline as the gasoline flows upwardly through column 1, the KOH solution flowing downwardly extracts the mercaptans from the gasoline and becomes fouled or fat with mercaptides. The fouled or fat solution flows from column 1 through pipe 9. In pipe 9, the fouled or fat potassium hydroxide solution is mixed with an alkyl phenolate-potassium hydroxide mixture, containing about 1 to about 67 weight percent alkyl phenols, about 39 to about 33 weight percent potassium hydroxide and the balance water to make 100 weight percent, introduced from pipe 21 under control of valve 20.

The mixture of fat potassium hydroxide solution and alkyl phenolates flows into separator 10 where it separates into an upper phase 11 comprising the alkyl phenolates and mercaptides and a lower phase 12 comprising regenerated potassium hydroxide solution.

The regenerated or lean potassium hydroxide solution leaves separator 10 through pipe 18 and with valve 28 open and valve 23 closed, passes through pipe 18 with valve 30 closed and valve 31 open to pipe 17 and thence to the column 1 for treatment of further amounts of gasoline.

The upper phase in separator 10 comprising alkyl phenolates, potassium hydroxide, water and mercaptides leaves separator 10 through line 13 and thence to regenerator 14. Preferably, regenerator 14 is a steam stripper of suitable construction into which steam is introduced through pipe 15. The steam rises through the alkyl phenolate-mercaptide mixture decomposing the mercaptides to mercaptans which volatilize and escape through vent 16 and the alkali metal hydroxide flows with the regenerated alkyl phenolate mixture out of regenerator or stripper 14 through line 17. With valve 20 open and valves 19 and 30 closed, the regenerated alkyl phenolate mixture flows through pipe 21 to pipe 9 ready for use in regenerating further amounts of fat potassium hydroxide solution.

On the other hand, when treating a mixture of hydrocarbons containing predominantly $C_5+$ mercaptans it can be desirable to extract the mercaptans directly with an alkyl phenolate-potassium hydroxide-water mixture, hereinafter designated as KOR mixture, as the sole extracting medium. This can be done in a method illustrated in Figure 12.

Thus, raw straight run gasoline or kerosine, for example, containing primarily $C_5+$ mercaptans is introduced into column 1 through line 7. Lean KOR extracting mixture is introduced into the column through pipe 17. The lean KOR mixture flows downwardly countercurrent to the petroleum fraction flowing upwardly and extracts the mercaptans therefrom. The treated gasoline leaves the column through line 8 and the fat KOR leaves the column through pipe 9. With valve 34 open and valve 35 closed, the fouled or fat KOR passes directly to the stripper 14 where the mercaptides are decomposed and the resulting mercaptans volatilized. The regenerated or lean KOR leaves the stripper 14 through pipe 17. When necessary, the concentration of free KOH and water is adjusted and regulated by admixing KOH solution introduced into pipe 17 from pipe 18.

West Texas straight run gasoline was treated in the foregoing manner with the results given in Table III.

*Table III*

Operating conditions:
Oil charge rate, vol./hr _____ 1,000
Treating solution (KOR), vol./hr _____ 250
Treating solution (KOR), vol _____ 210
Temperature, °F _____ 99–100
Number of stages _____ 2
Stripper—
   Temperature, °F _____ 265
   Pressure, p. s. i. g _____ 0

| Mercaptan S, Mgm./100 ml. || Stripping steam, lbs./gal. oil | Number cycles on treating soln. ||
|---|---|---|---|---|
| Inlet | Outlet | | Start | Finish |
| 64 | 1 | 1.5 | 0 | 29 |
| 64 | 1 | 1.8 | 29 | 36 |
| 64 | 1 | 1.0 | 36 | 50 |
| 64 | 1 | 0.5 | 50 | 74 |
| 64 | 1 | 0.25 | 74 | 136 |

When desirable or necessary, both the KOR and the KOH treating mixtures can be regenerated. Thus, referring to Figure 12 the KOH solution can be freed of traces of mercaptides by passing the solution from separator 10 through line 18 with valve 28 closed and valve 23 open to pipe 22 and then to stripper or regenerator 24. The stripped KOH leaves the regenerator 24 through pipe 27 and thence to line 18. The KOH can be freed of mercaptides either by steam stripping or by oxidation of the mercaptides to polysulfides. The regenerated KOH is passed to a settler not shown where the polysulfides rise to the top of the KOH solution and are removed.

In the operation of stripper 24, steam or air is introduced through line 25 and, when using steam, the mercaptans and uncondensed steam escape through vent 26.

The direct and indirect extraction of mercaptans from hydrocarbon fluids by MOS treating medium is illustrated by the extraction of mercaptans from a mixture of straight run and cracked gasolines. The mixture contains not only the light $C_1$ to $C_4$ mercaptans of the cracked gasoline but also the heavy $C_5+$ mercaptans of the straight run gasoline.

The solubility of the heavy mercaptans ($C_5+$) in aqueous alkali metal hydroxide being insufficient from a practical standpoint, it is necessary to directly extract the heavy mercaptans from the mixture with a treating medium having greater solubility for the heavy ($C_5+$) mercaptans than an aqueous alkali metal hydroxide solution devoid of solutizer salt. In accordance with the principles of the present invention, the hydrocarbon mixture containing both light and heavy mercaptans is contacted with an MOS treating medium in one stage and with MOH treating medium in another stage. After the two treating mediums become fouled with mercaptides the two treating mediums are mixed. Upon separating the MOS phase from the MOH phase it is found that the mercaptides in the fouled MOH treating medium have migrated to the fouled MOS phase thereby regenerating the MOH treating medium. The MOS phase containing mercaptans (mercaptides) extracted directly from the mixture of straight run and cracked gasoline and the mercaptans (mercaptides) extracted indirectly through the MOH treating medium from the gasoline mixture is regenerated by steaming.

This can be done, for example, in accordance with the principles of the present invention, in the manner illustrated in Figure 12.

For the purposes of illustration, employing an aqueous KOH solution containing about 37 to about 60 weight percent potassium hydroxide, balance substantially water and a KOR solution comprising about 1 to about 68 weight percent alkyl phenols, about 33 to about 39 weight percent potassium hydroxide and the balance water to make 100 weight percent; a raw fraction of petroleum, for example, a mixture of straight run and cracked gasolines, is introduced into tower 1 through line 7. Lean KOH is introduced into tower 1 through pipe 36 under control of valve 30. Lean KOR is introduced into tower 1 through pipe 17. The mixed gasoline rises countercurrent to the downwardly flowing KOH whereby the light $C_1$ to $C_4$ mercaptans are extracted by the KOH. After rising counter-current through the lean KOH, the hydrocarbon mixture passes the point of entry of the lean KOH and reaches the point of exit of the KOR mixture. The hydrocarbon mixture continues to rise counter-current to the KOR mixture to leave the tower through line 8.

The fat KOR leaves the tower through pipe 37 under control of valve 32 and is returned to the bottom of the tower through pipe 38.

In the bottom of tower 1 the fat KOR mixes with the fat KOH and the mixture of extracting media leaves the tower through pipe 9. Generally, the KOH and the KOR phases are in balance in pipe 9 but, when necessary, additional KOR can be mixed therewith by introducing lean KOR through pipe 21. The mixed phase mixture of KOH and KOR extracting media passes to separator 10 through pipe 9 under control of valve 35 with valve 34 closed.

In separator 10 the phases separate to yield an upper KOR phase containing substantially all of the light and heavy mercaptans extracted from the gasoline and lower regenerated KOH layer which is ready for use as an extracting medium.

It is to be noted that while the KOR extracting medium may be staturated wtih respect to heavy mercaptans before being mixed with the fat KOH, the KOR still retains ample capacity to extract light mercaptans from the KOH solution.

When it is necessary to remove the last traces of mercaptides from the regenerated KOH in separator 10, the lower lean KOH layer can be sent to stripper or regenerator 24 through lines 18 and 22 and there either steam stripped of mercaptides or the mercaptides converted to polysulfides by air and separated from the KOH solution in any manner known to the art.

The fat KOR extracting medium containing the heavy mercaptans directly extracted by the KOR from the gasoline and the light mercaptans indirectly extracted through the fat KOH leaves the separator 10 through pipe 13 and thence to stripper 14 wherein the mercaptides are decomposed by steam entering through pipe 15 and vented through pipe 16.

The lean KOR leaves stripper 14 through pipe 17 ready for use in treating further amounts of sour hydrocarbons.

The regenerated lean KOH solution when not treated to remove traces of mercaptides leaves separator 10 through line 18 and thence is returned to the extracting tower 1. When the KOH solution is to be treated to remove traces of mercaptides, it leaves separator 10 by pipe 18, thence through pipe 22 to stripper 24. The stripped KOH leaves stripper 24 through pipe 27 and thence to pipe 18 for return to tower 1.

It will be observed that the method of removing mercaptans from hydrocarbon fluids as schematically illustrated in Figure 12 has several variations but that in all variations the extracted mercaptans are ultimately concentrated in the KOR treating medium. This provides a method of removing mercaptans directly or indirectly or directly and indirectly with a KOR treating medium. As a consequence, it is only necessary to strip the KOR medium rather than strip both extracting media.

Another means of applying the principles of the present invention to the sweetening of hydrocarbon mixtures is illustrated in a schematic manner in Figure 13. The schematic flow sheet Figure 13 again illustrates the indirect and direct extraction of mercaptans from hydrocarbon fluids with MOS treating medium. Raw distillate such as straight run gasoline or a kerosine is introduced through conduit 50 into tower 51. Tower 51 can be of any suitable construction, packed or unpacked, whereby intimate contact of two substantially immiscible liquids can be obtained. A lean aqueous solution of KOH comprising about 37 to about 55 weight percent KOH and the balance, to make 100 weight percent, water is introduced into tower 51 through line 52. The kerosine flows upwardly counter-current to the KOH flowing downwardly. The partially demercaptanized kerosine leaves the tower 51 via conduit 53. The fat KOH solution leaves tower 51 through line 54.

The partially demercaptanized kerosine passes through conduit 53 to second stage tower 55 which can be of the same or different construction as tower 51 and suitable for intimate contact of two immiscible liquids.

Lean KOR which comprises about 1 to about 68 weight percent alkyl phenols, about 33 to about 39 weight percent potassium hydroxide and the balance, to make 100 weight percent, water is introduced into tower 55 through line 56. The partially demercaptanized kerosine flows upwardly in tower 55 countercurrent to the downwardly flowing lean KOR.

The sweet kerosine leaves tower 55 through conduit 57. When necessary or desirable, the kerosine leaving tower 57 can be subjected to one or more additional extractions with KOR, or as indicated usually will be sweet and ready for storage, distribution or after treatment.

The fat KOR leaves tower 55 via line 58 to mix with fat KOH in line 54. The two-phase mixture of KOH and KOR then passes to separator 59 wherein the KOR extracting medium containing the mercaptans extracted from the kerosine by the KOR and the mercaptans extracted from the KOH by the KOR rises to form the upper layer 60.

The upper KOR layer leaves separator 59 via line 62 and thence to stripper 63. In stripper 63 the mercaptides in the fat KOR are decomposed by steam introduced through line 65 and vented through line 64. The regenerated, lean KOR leaves stripper 63 through line 66 ready to start another cycle.

The lower KOH layer 61 leaves separator 59 by line 67 and with valve 68 closed and valve 69 open is returned to tower 51 through line 52. When necessary or desirable, the lean KOH leaving separator 59 through line 67 can be sent via line 70 to stripper 71 where traces of mercaptides can be decomposed by steam introduced through line 72 and vented with mercaptans through line 73 or converted to polysulfides by air introduced through line 72.

The lean KOH leaves stripper 71 through line 74 and thence to lines 67 and 52 to towers 51 ready to begin a cycle. When the mercaptides are converted to polysulfides, provision is made to separate the polysulfides from the lean KOH in any suitable manner, as for example by settling or extraction with an organic solvent therefor.

In Figure 14 is illustrated in a schematic manner an application of the principles of the present invention to the treatment of three stocks simultaneously with regeneration of the fat KOH by mixing with the fat KOR. That is to say, mercaptans are extracted directly with MOS treating medium from two stocks and indirectly from the third. It is to be noted that the fat KOR is "fat" to heavy mercaptans but "lean" to light mercaptans such as predominate in the fat KOH. Three or more towers or stages 80, 81 and 82 are provided. Cracked gasoline or any other mixture of hydrocarbons containing predominantly light, $C_1$ to $C_4$, mercaptans is introduced into one of the towers, for example tower 80, through conduit 83. Lean KOH is introduced into tower 80 through line 84. The cracked gasoline flows upwardly counter-current to the downwardly flowing KOH and thereby the light mercaptans are extracted from the cracked gasoline by the lean KOH. In so doing, the lean KOH becomes a fat KOH. The demercaptanized cracked gasoline leaves tower 80 through conduit 85 to after treatment, storage and/or distribution. The fat KOH leaves tower 80 through line 86.

A mixture of hydrocarbons containing some light mercaptans but predominantly heavy mercaptans, such as straight run gasoline is introduced through conduit 87 into tower 81. Lean KOR is introduced through line 88 into tower 81 under control of valve 89. The straight run gasoline flows upwardly counter-current to the downwardly flowing lean KOR and thus is demercaptanized. The demercaptanized straight run gasoline leaves tower 81 via conduit 90 to after treatment, storage and/or distribution. The fat KOR, fat to heavy mercaptans, leaves tower 81 through line 91.

A mixture of hydrocarbons containing substantially only heavy mercaptans such as a kerosine is introduced into tower 82 through conduit 92. A lean KOR is introduced into tower 82 through line 93 under control of valve 94. The kerosine flows upwardly through tower 82 counter-current to the downwardly flowing lean KOR and thus is demercaptanized. The lean KOR thereby becomes fat to heavy mercaptans. The demercaptanized kerosine leaves tower 82 through conduit 95 to after treatment, storage and/or distribution. The fat KOR leaves tower 82 via line 96.

In line 97 the KOH from tower 80 fat-to-light mercaptans, the KOR from tower 81 fat-to-heavy mercaptans, and the KOR from tower 82 fat-to-heavy mercaptans, meet and mix to form two phases. The two-phase mixture flows through line 97 to separator 98 wherein the KOR phase forms the upper layer 99 containing the mercaptans extracted directly from the straight run gasoline and kerosine and the mercaptans extracted indirectly from the cracked gasoline by migration from the fat KOH. A lean KOH results and forms the lower layer 100 in separator 98.

The lean KOH leaves separator 98 through line 101 and, with valve 102 closed and valve 103 open, returns through line 84 to tower 80. When necessary or desirable, the residual mercaptans in the lean KOH can be removed by sending the lean KOH or a portion thereof through line 104 to stripper 105 where the mercaptides are decomposed to mercaptans by steam admitted through pipe 106 and vented through pipe 108, or the mercaptides are converted to polysulfides by air admitted through pipe 106 and vented through pipe 108.

When the mercaptides are decomposed by steam, the stripped KOH leaves stripper 105 through line 107 to be passed therethrough to line 84 and thence to tower 80. When the mercaptides are converted to polysulfides which form an upper layer in stripper 105, they can be steam distilled, separated by decantation or by extraction with a solvent therefor.

Returning now to separator 98 and upper fat KOR layer 99. All of the extracted mercaptans are concentrated in KOR layer 99. KOR layer 99 contains substantially all of the mercaptans extracted from the three hydrocarbon mixtures. KOR layers 99 passes through line 109 to stripper 110 where the mercaptides are decomposed to mercaptans by steam admitted through pipe 111 and vented through pipe 113. The lean KOR leaves stripper 110 through line 112 ready for another cycle.

Figure 15 schematically illustrates substantially simultaneous direct and indirect extraction of mercaptnas by a MOS treating medium by the treatment of a mixture of hydrocarbons with an equilibrium two-phase mixture of KOH and KOR. The KOH phase is in equilibrium at 90° F. and higher with the KOR phase when the KOH phase comprises about 37 to about 60 weight percent potassium hydroxide and the balance, to make 100 weight percent, water and the KOR phase comprises about 1 to about 68 weight percent alkyl phenols, about 33 to about 39 weight percent potassium hydroxide and the balance, to make 100 weight percent, water.

A hydrocarbon mixture from which mercaptans are to be removed is introduced into tower 120 through conduit 121. Lean KOH and lean KOR as a two-phase treating medium is introduced into tower 120 through line 122. The hydrocarbon mixture flows upwardly through tower 120 counter-current to the downwardly flowing two-phase treating medium. Light mercaptans in the hydrocarbon mixture are extracted therefrom by the KOH phase and substantially simultaneously migrate to the KOR phase. Heavy mercaptans are directly extracted by the KOR phase. The free KOH content of the KOR phase is constantly renewed by contact with the KOH phase. Thus, the extracted mercaptans are concentrated in the KOR phase of the two-phase treating medium. The treated hydrocarbon mixture leaves tower 120 through conduit 123.

The lean two-phase KOH—KOR thus becomes a fat two-phase KOH—KOR having the extracted mercaptans concentrated in the KOR phase and leaves tower 120 through line 124. The fat KOH—KOR passes through line 124 to separator 125 wherein the fat KOR forms the upper layer and the lean KOH forms the lower layer. The fat KOH phase while in contact with the KOR has given up the mercaptans extracted by the KOH phase to the KOR phase. Consequently, when the two phases reach the separator 125, the KOH phase is lean.

The fat KOR upper layer 126 in which the extracted mercaptans are concentrated leaves separator 125 through line 128 to stripper 129 where the mercaptides are decomposed by steam admitted through pipe 130 into mercaptans which are vented through pipe 133. The regenerated lean KOR phase leaves stripper 129 via line 131 and passes to line 132.

The lean lower layer of KOH leaves separator 125 through line 134 and passes through line 135 to line 132 wherein the lean KOH mixes with the lean KOR to form a two-phase lean extracting medium which is returned through line 122 to tower 120 to begin another cycle.

When desirable or necessary, the whole or a part of the lean KOH from separator 125 can be passed through lines 134 and 136 under control of valve 137 to stripper 138 wherein the mercaptide-residue in the lean KOH can be decomposed by steam admitted through pipe 139 to mercaptans and vented through pipe 141. The stripped KOH leaves the stripper 138 through line 140 and passes to line 132 where it is mixed with lean KOR to form a two-phase extracting medium.

Alternatively, the residual mercaptides in the lean KOH in stripper 138 can be converted to polysulfides by air admitted through line 139. The polysulfides so produced can be separated from the stripped lean KOH by distillation, decantation or extraction with a solvent therefor.

A two-phase water-alkali metal hydroxide-alkyl phenolate (cresylate) or an alkyl phenolate (cresylate) mixture can be used to sweeten a hydrocarbon mixture containing mercaptans in the manner illustrated in Figure 16. Aqueous alkali metal hydroxide solution and aqueous alkali metal salt of cresols containing water, alkali metal hydroxide (MOH) and the alkali metal salts of alkyl phenols (cresylates) (MOR) in such concentrations as to form two phases can be used or the MOR component of the two-phase system can be used.

When the two-phase aqueous MOR—MOH mixture is used, it is introduced into contactor 151 through line 153. A hydrocarbon mixture containing mercaptans is introduced into contactor 151 through line 152. The two-phase aqueous MOR—MOH mixture comprising 30 weight percent potassium cresylates, 36 weight percent potassium hydroxide and 34 weight percent water flows downwardly through contactor 151 while the hydrocarbon mixture flows upwardly counter-current to the downwardly flowing two-phase aqueous MOR—MOH mixture. Mercaptans are extracted from the hydrocarbon mixture as it flows upwardly in contact with the two-phase aqueous MOR—MOH mixture through contactor 151 and the at-least-partially-demercaptanized hydrocarbon mixture leaves contactor 151 through line 154. Through contact with the hydrocarbon mixture the two-phase aqueous MOR—MOH mixture is fouled with mercaptans. The fouled or fat two-phase aqueous MOR—MOH mixture flows from contactor 151 through line 155 to stripper 156. In stripper 156 the mercaptides are decomposed by steam admitted through pipe 157 into mercaptans and the hydroxide of the alkali metal. The mercaptans are volatilized and escape through vent 158. The lean aqueous two-phase MOR—MOH mixture leaves stripper 156 through line 159 and flows to separator 160 in which the two-phase mixture separates into an upper lean aqueous MOR phase 161 comprising about 67 weight percent potassium cresylates, about 13 weight percent potassium hydroxide and about 20 weight percent water, and a lower lean aqueous MOH phase 162 comprising about 54 weight percent potassium hydroxide and about 46 weight percent water. The lean aqueous MOR upper phase leaves separator 160 via line 163. The lean aqueous MOH solution leaves separator 160 via line 164 and flows into line 165; by regulation of valve 166 all or part of the lean aqueous MOH mixture can be sent through line 165 to line 167 and thence to line 159 or sent through line 165 to line 168 and thence through line 153 to the contactor 151.

Single phase aqueous MOR can be used in the same manner as the two-phase aqueous MOR—MOH mixture. In both instances the alkali metal hydroxide concentration of the MOR mixture is maintained constant by contact with the aqueous MOH phase. In the use of the two-phase reagent, maintenance of the alkali metal hydroxide concentration of the MOR phase is substantially constant. In the use of the MOR phase alone, maintenance of the alkali metal hydroxide concentration of the MOR phase is intermittent.

Figure 17:
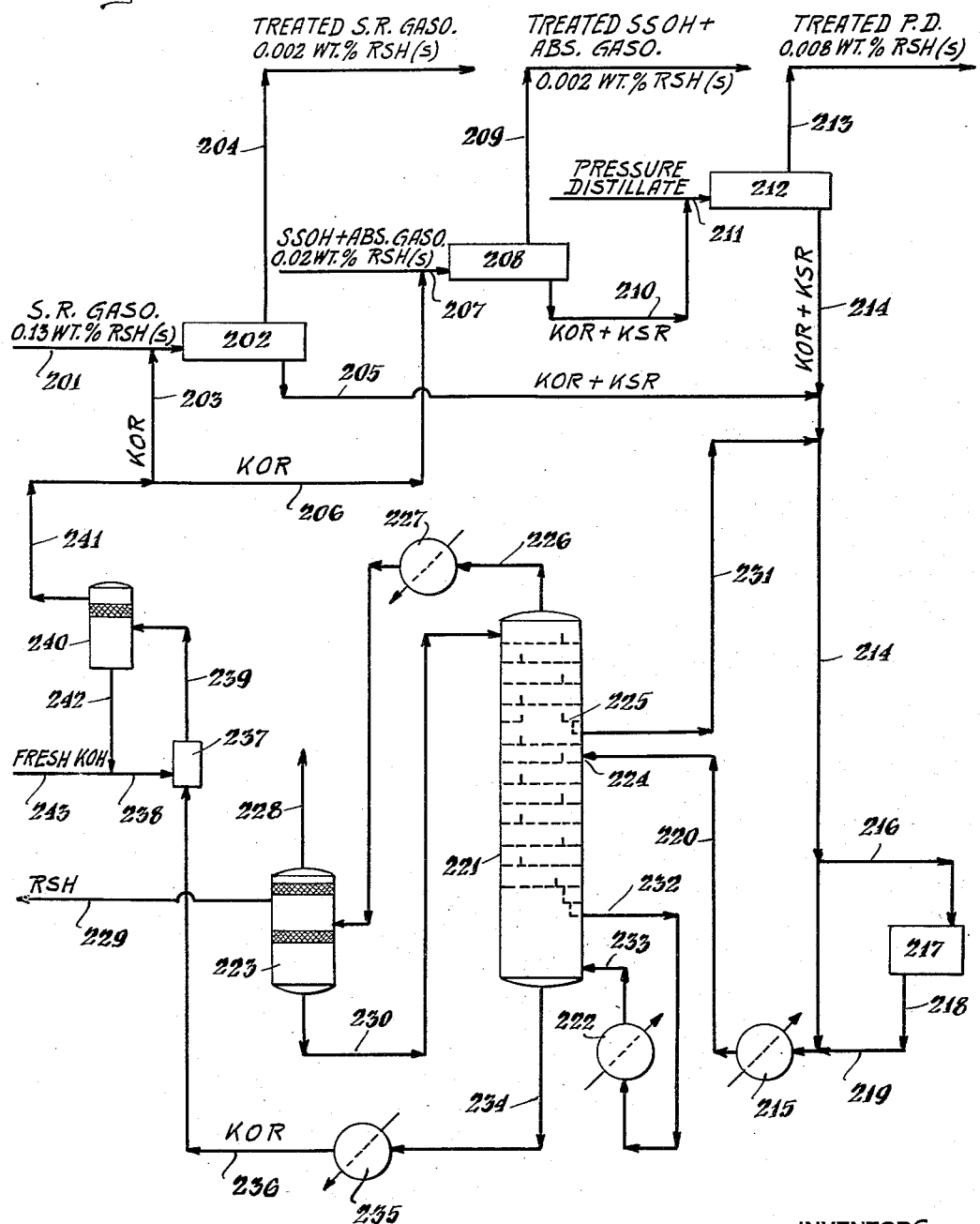
Figure 17 is a highly diagrammatic flow sheet of another embodiment of the present invention.

Referring now to Figure 17. Straight run gasoline containing about 0.13 weight percent mercaptan-sulfur flows from a source not shown through line 201 to a treating unit, preferably having a plurality of extraction stages, designated as 202. A portion of the lean, fortified MOS, i. e., an aqueous solution of potassium cresylate for example, flowing from KOR—KOH settler 240 through line 241 flows through line 203 and is intimately contacted with the aforesaid straight run gasoline in treating unit 202 at the rate of about 1 barrel of KOR solution per 13–14 barrels of straight run gasoline. The treated gasoline is separated from the KOR treating solution. The treated gasoline contains about 0.002 weight percent mercaptan-sulfur and flows from treating unit 202 through line 204. The fouled or spent KOR solution flows from treating unit 202 through line 205.

The balance of the lean, fortified KOR solution in line 241 flows through line 206 to line 207 through which steam still overhead and absorber gasoline (SSOH+abs. gaso.) containing about 0.02 weight percent mercaptan-sulfur flows from a source not shown. The lean, fortified KOR is mixed with the overhead and absorber gasoline in line 207 in the proportion of about 0.9 barrel of lean, fortified KOR per 10 barrels of overhead and absorber gasoline. The mixture of overhead and absorber gasoline and lean, fortified KOR solution flows through line 207 to sweetener 208 which preferably is a one-stage sweetener although there can be a plurality of sweetening stages. In sweetener 208 the sweetened gasoline containing about 0.002 weight percent mercaptan-sulfur is separated from the partially spent KOR treating solution and flows therefrom through line 209.

The partially spent KOR solution flows from sweetener 208 through line 210 to line 211 wherein it is mixed in the proportion of 1 barrel of partially spent KOR solution per 3.5 barrels of pressure distillate containing about 0.36 weight percent mercaptan-sulfur flowing from a source not shown through line 211.

The mixture of pressure distillate and partially spent KOR solution flows through line 211 to sweetener 212 which preferably is a multi-stage sweetener. The treated pressure distillate containing about 0.008 weight percent mercaptan-sulfur is separated from the spent KOR solution in treating unit 212 and flows therefrom through line 213.

The spent KOR flows from sweetener 212 through line 214 to which is added spent KOR from treater 202 flowing through line 205. The combined spent KOR flows through line 214 to heat exchanger 215. When desirable or necessary, a portion or all of the spent KOR can be diverted from line 214 to line 216 and passed to filtering or other facilities for removal of solid particles at 217. The filtered spent KOR flows therefrom through line 218 to line 219 and thence to heat exchanger 215.

From heat exchanger 215 the spent KOR flows through line 220 to suitable regenerating facilities such as a steam stripper comprising a fractionating tower 221, a reboiler 222 and a mercaptan separator 223. The KOR solution flows to tower 221 and is introduced thereinto at some suitable point such as 224 below the trap tray 225. The steam generated in reboiler 222 rises counter-current to the downwardly flowing stripped KOR solution decomposing the mercaptides present in the spent KOR solution to form mercaptans which are volatile under the conditions. The steam and mercaptans pass overhead through line 226 to heat exchanger 227 and mercaptan separator 223 where the distillate products, volatile at the separator temperature, are vented to the refinery fuel system through line 228, condensed mercaptans are drawn-off through line 229 and the condensed steam flows through line 230 back to stripping tower 221 for use as reflux. A portion of the reflux water is trapped out on tray 225 and flows therefrom through line 231 to spent KOR line 214.

After flowing downwardly through the stripping tower 221 the KOR denuded of mercaptides collects at the bottom of the tower. A portion of the stripped regenerated KOR solution flows from the tower through line 232 to reboiler 222 and thence back to the tower through line 233.

The regenerated KOR solution flows from tower 221 through line 234 to cooler 235 where the temperature of the regenerated KOR is reduced to extraction temperatures. The cooled KOR regenerated with respect to mercaptans flows from cooler 235 through line 236 to mixer 237 where the KOR solution regenerated with respect to mercaptans is intimately mixed with an aqjueous alkali metal hydroxide solution of such concentration of alkali metal hydroxide that after mixing of the alkali metal hydroxide solution (in this illustration KOH solution) with the KOR solution regenerated as to mercaptans, the mixture will form a heterogeneous two-phase system. The KOH solution flows to mixer 237 from a source not shown through line 238. The two-phase system then flows from mixer 237 through line 239 to KOR—KOH separator 240 wherein the KOR solution fortified with respect to alkali metal hydroxide content as well as substantially devoid of, or regenerated with respect to, mercaptans, separates as an upper layer.

The lean, fortified KOR flows from separator 240 through line 241 for re-use in removing mercaptans from various petroleum fractions. The lower KOH solution flows from separator 240 through lines 242 and 238 to mixer 237. From time to time the KOH solution is re-fortified by addition thereto of fresh KOH solution flowing from a source not shown through line 243.

From the foregoing it is manifest that the present invention provides for extracting mercaptans from hydrocarbon fluids directly or indirectly with a liquid treating medium containing free alkali metal hydroxide, alkali metal salt of at least one solutizer, and water in which the concentration of the salt of the solutizer is such that the liquid treating medium is substantially immiscible with aqueous solutions of the alkali metal hydroxide at temperatures between about 60° F. and about 150° F. In other words, the present invention provides a means for extracting mercaptans from hydrocarbon fluids with aqueous alkaline solutions and concentrating the extracted mercaptans in a liquid treating medium containing free alkali metal hydroxide, alkali metal salt of at least one solutizer and water as described hereinbefore. It has been demonstrated that the extracted mercaptans can be concentrated directly in the solutizer salt treating medium by direct extraction of the hydrocarbon fluid containing mercaptans with the solutizer salt-treating medium (MOS). It has been demonstrated hereinbefore that the extracted mercaptans can be concentrated in the MOS treating medium by extracting mercaptans from a hydrocarbon fluid with aqueous alkali metal hydroxide solution and then extracting the extracted mercaptans from the aqueous alkali metal hydroxide solution with a solutizer salt-treating medium substantially immiscible with the aqueous alkali metal hydroxide solution. It has also been demonstrated that the extracted mercaptans can be concentrated in the solutizer salt-treating medium (MOS) directly and indirectly and the solutizer salt treating medium constantly fortified with respect to its concentration of free alkali metal hydroxide by contacting a hydrocrabon fluid containing mercaptans with a treating medium comprising two mutually substantially immiscible phases, one of which is a liqjuid solutizer salt phase (MOS) and the other is an aqueous alkali metal hydroxide phase (MOH). Accordingly, the present invention provides a novel means of concentrating mercaptans extracted from hydrocarbon fluids in a volume of solutizer salt-treating medium which is substantially immiscible at about 60° F. to about 150° F. with strong, i. e. at least about 28 weight percent alkali metal hydroxide which volume of solutizer salt-treating medium need only be about 20 to about 35 percent of the volume of prior art solutizer treating solutions to achieve equivalent extraction.

Accordingly, the present invention provides a process for removing mercaptans from mercaptan-containing hydrocarbon fluids which comprises contacting in a contact zone a mercaptan-containing hydrocarbon fluid with an extraction medium selected from the group consisting of (1) a liquid mixture comprising at least 1 weight percent of at least one solutizer, at least about 28 weight percent of an alkali metal hydroxide and the balance, to make 100 weight percent, water, the concentrations of said solutizer and of said alkali metal hydroxide in said liquid mixture being such that said liquid mixture forms two mutually substantially immiscible phases at temperatures of about 60° F. to about 150° F., one of said phases being a solutizer salt phase, designated herein as the MOS phase, and the other phase being an aqueous alkali metal hydroxide phase, designated herein as the MOH phase, (2) the solutizer salt phase of said liquid mixture, and (3) the alkali metal hydroxide phase of said liquid mixture, to produce a mercaptan-containing extraction medium and a treated hydrocarbon fluid of substantially reduced mercaptan content; separating said mercaptan-containing extraction medium from said treated hydrocarbon fluid; contacting said mercaptan-containing extraction medium with said solutizer salt phase to transfer mercaptans from said alkali metal hydroxide phase to said solutizer salt phase and to produce a regenerated alkali metal hydroxide phase when said extraction medium is said alkali metal hydroxide phase and separating solutizer salt phase containing said transferred mercaptides from said regenerated alkali metal hydroxide extraction medium; separating mercaptide-containing solutizer salt phase from alkali metal hydroxide phase to obtain a mercaptide-containing solutizer salt phase and an alkali metal hydroxide phase practically free from mercaptides when the extraction medium is said liquid mixture; removing mercaptides from the employed mercaptide-containing solutizer salt phase to obtain a regenerated solutizer salt phase; and returning said regenerated alkali metal hydroxide phase, when said alkali metal hydroxide phase is the extraction medium; said regenerated solutizer salt phase mixed with said alkali metal hydroxide phase practically free from mercaptides, when said liquid mixture is the extraction medium; and said regenerated solutizer salt phase, when said solutizer salt phase is the extraction medium; to said contacting zone.

Examples of the composition of two phases in equilibrium at 140° F. are for the MOR phase, a solution containing about 7 to about 20 weight percent alkyl phenols, about 43 to about 48 weight percent sodium hydroxide, and the balance, to make 100 percent, water, i. e., about 37 to about 45 weight percent water and for the MOH phase a solution containing about 53 to about 59 weight percent sodium hydroxide and about 41 to about 47 weight percent water, and for potassium hydroxide, a KOR phase containing about 1 to about 68 weight percent alkyl phenols, about 28 to about 39 weight percent potassium hydroxide and the balance, to make 100 weight percent, water, and for an MOH phase of about 37 to about 60 weight percent potassium hydroxide and the balance, to make 100 weight percent, water. Those skilled in the art will understand that at temperatures below about 90° F. the more concentrated mixtures are solids. For example, at 90° F., a mixture having a composition represented by a point on the phase boundary line between point M (Figure 3) and angle C is solid. However, at higher temperatures such mixtures are fluid. Similarly, the sodium hydroxide alkyl phenol water system is fluid at temperatures in excess of 90° F.

The present invention provides a means for extracting a mixture of hydrocarbons with a two-phase extracting medium to obtain a fat two-phase extracting medium, separating the fat two-phase extracting medium into a fat KOR phase which is regenerated to a lean KOR phase by steam stripping, and a lean KOH phase, and mixing the steam stripped or lean KOR phase with the lean KOH phase to make a lean two-phase extracting medium. The present invention also includes extracting a mixture of hydrocarbons containing predominantly light mercaptans with an aqueous KOH solution comprising about 37 to about 60 weight percent potassium hydroxide and the balance, to make 100 weight percent, water, to obtain a fat KOH solution, converting said fat KOH solution to a lean KOH solution by mixing the fat KOH solution with a KOR medium comprising about 1 to about 68 weight percent alkyl phenols, about 33 to about 39 weight percent potassium hydroxide and the balance, to make 100 weight percent, water, and separating a lean KOH solution from a fat KOR phase and steam stripping the fat KOR phase to obtain a lean KOR phase. The present invention likewise includes converting fat KOH solutions containing about 37 to about 60 weight percent potassium hydroxide, balance to make 100 weight percent, water, containing mercaptides to lean KOH solutions by mixing said fat KOH solution with a lean KOR phase containing about 1 to about 68 weight percent alkyl phenols, about 33 to about 39 weight percent potassium hydroxide and the balance, to make 100 weight percent, water, separating a lean KOH phase from a fat KOR phase containing mercaptans originally in said KOH phase and stripping said mercaptides from said KOR phase to provide a lean KOR phase.

Figure 3:
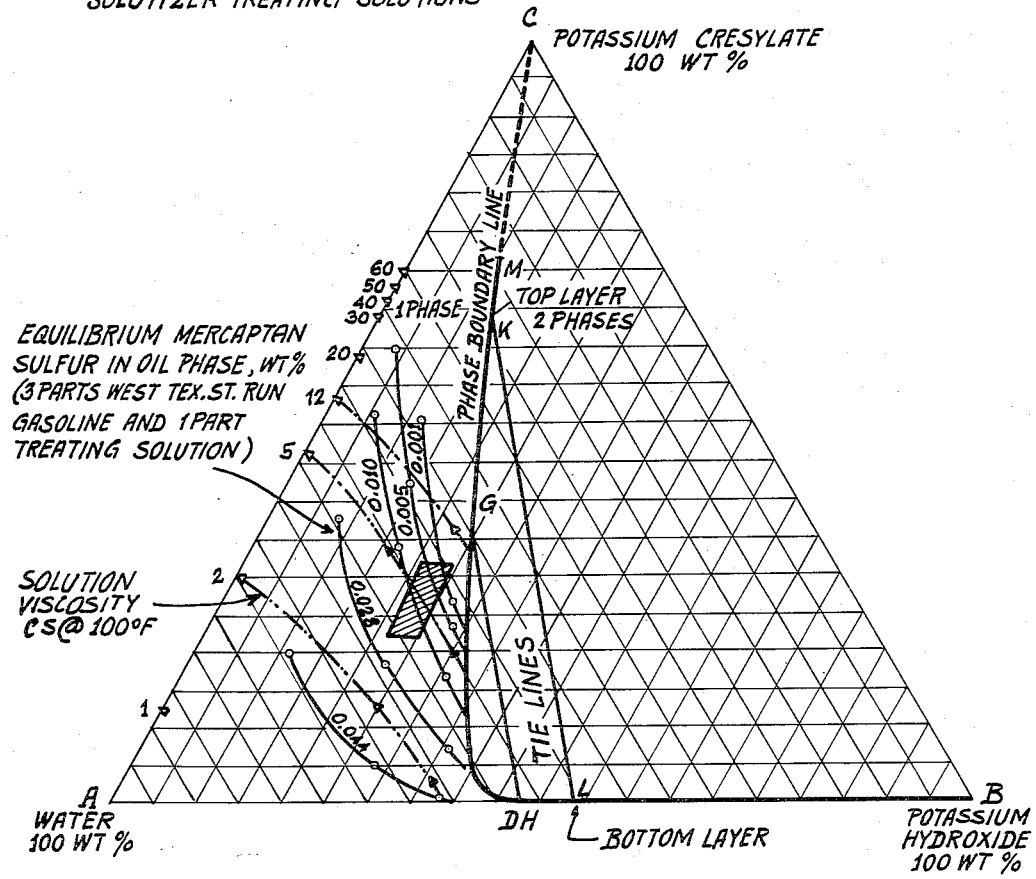
Figure 6:
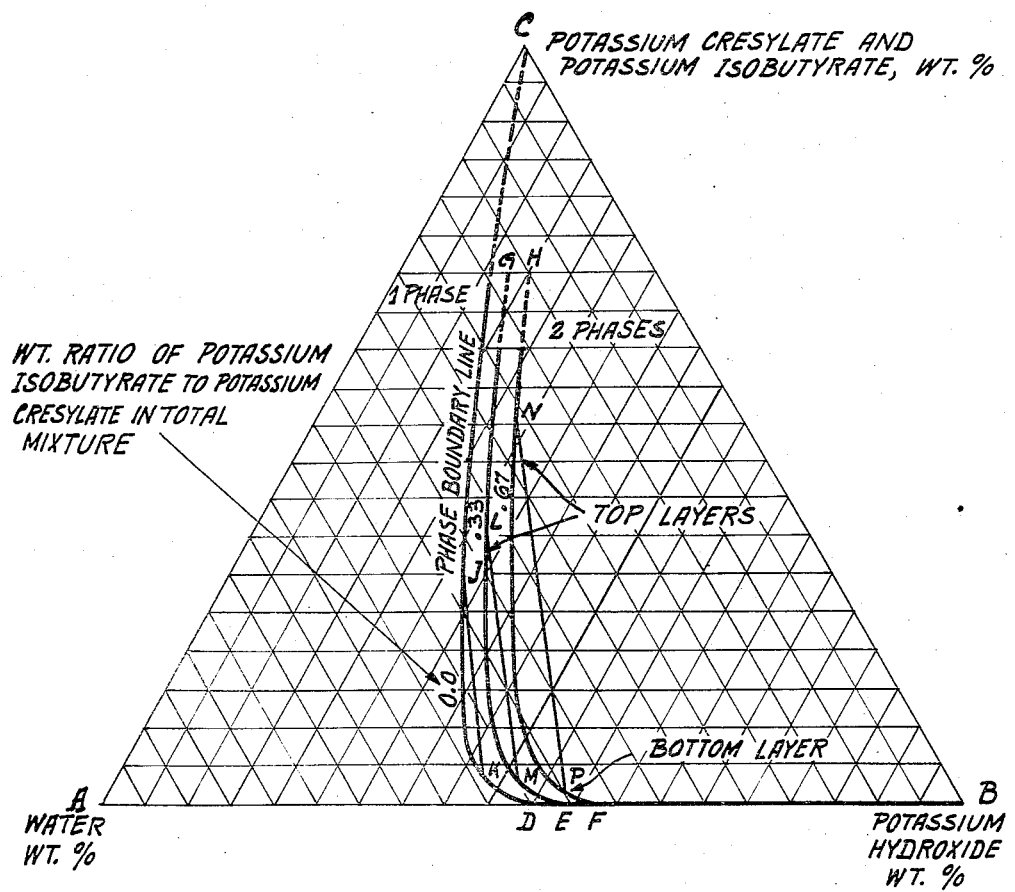
Figure 6 is a ternary diagram for the system potassium isobutyrate-potassium hydroxide-water and for the system potassium isobutyrate-potassium cresylate-water for the ratio of potassium isobutyrate to potassium cresylate of up to 0.67, potassium hydroxide and water at 90° F.
Figure 7:
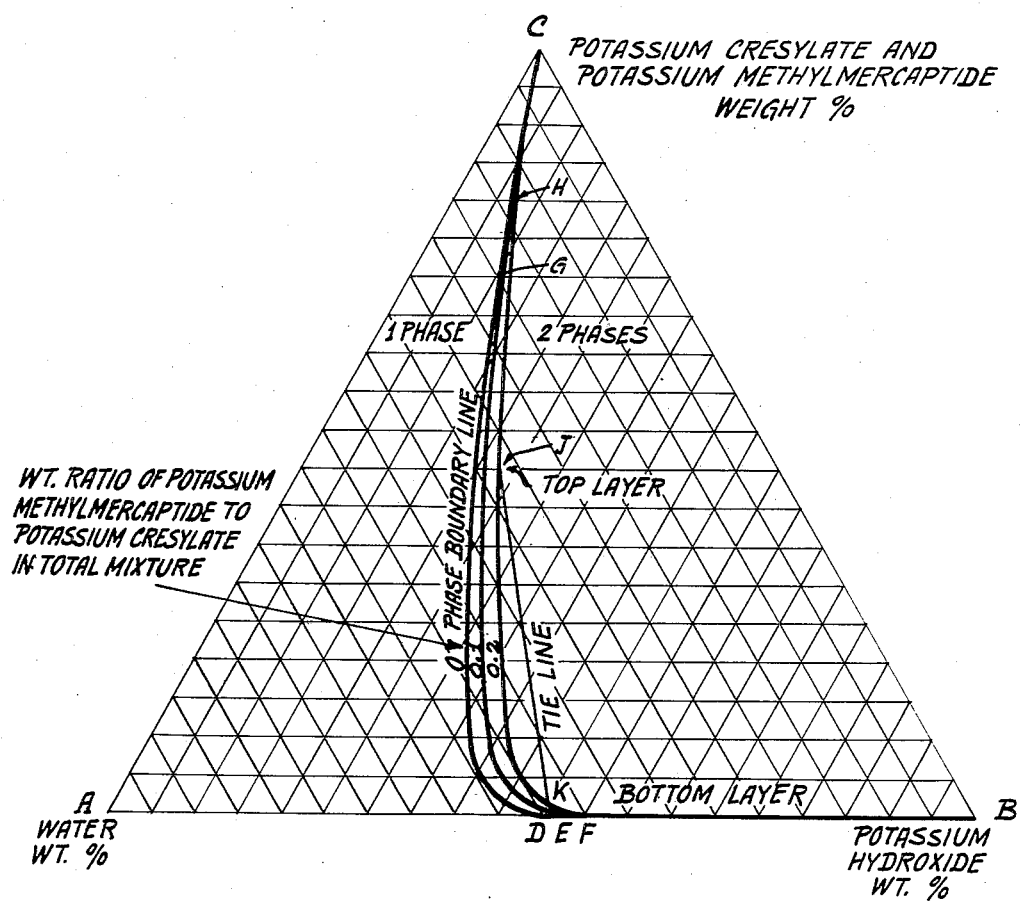
Figure 7 is a ternary diagram for the system potassium methyl mercaptide, potassium hydroxide and water and for the system potassium methyl mercaptide and potassium cresylate, potassium hydroxide and water in which the ratio of potassium methyl mercaptide to potassium cresylate is up to 0.2 at 90° F.
Figure 8:
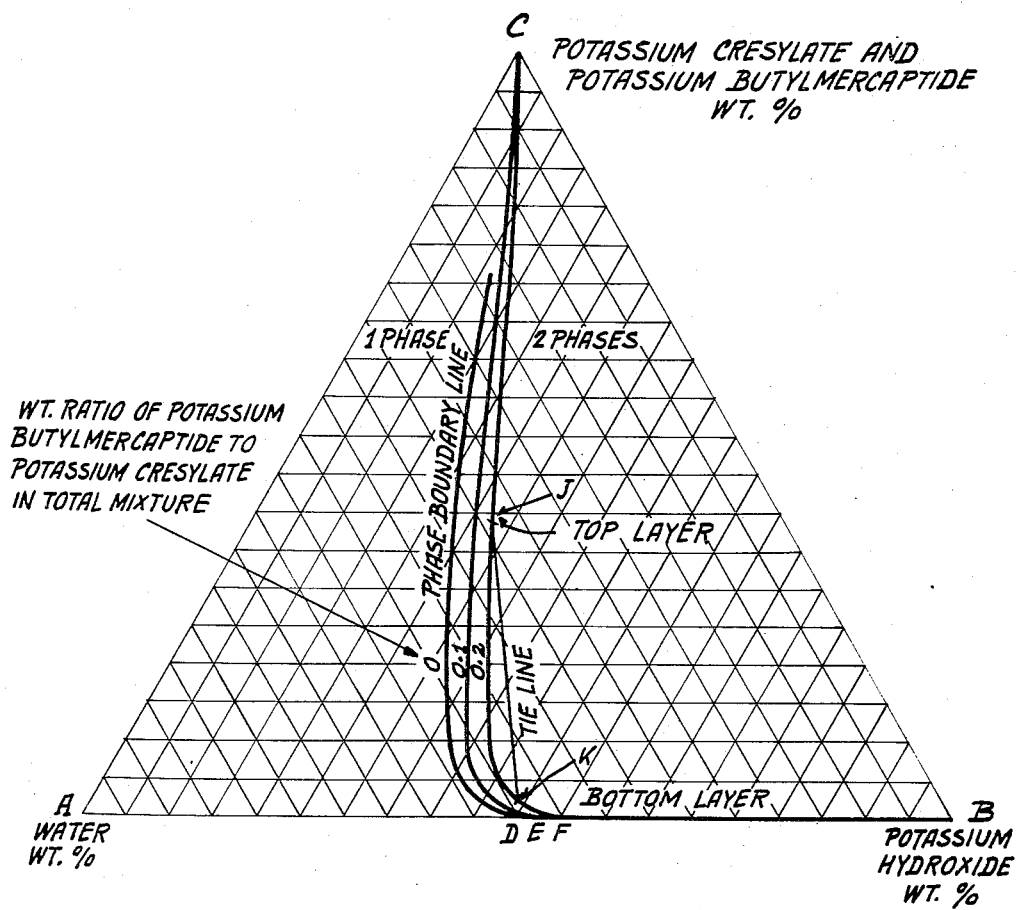
Figure 8 is a ternary diagram for the system potassium butyl mercaptide, potassium hydroxide and water and for the system potassium butyl mercaptide-potassium cresylate, potassium hydroxide and water in which the ratio of potassium butyl mercaptide to potassium cresylate is up to 0.2 at 90° F.
Figure 9:
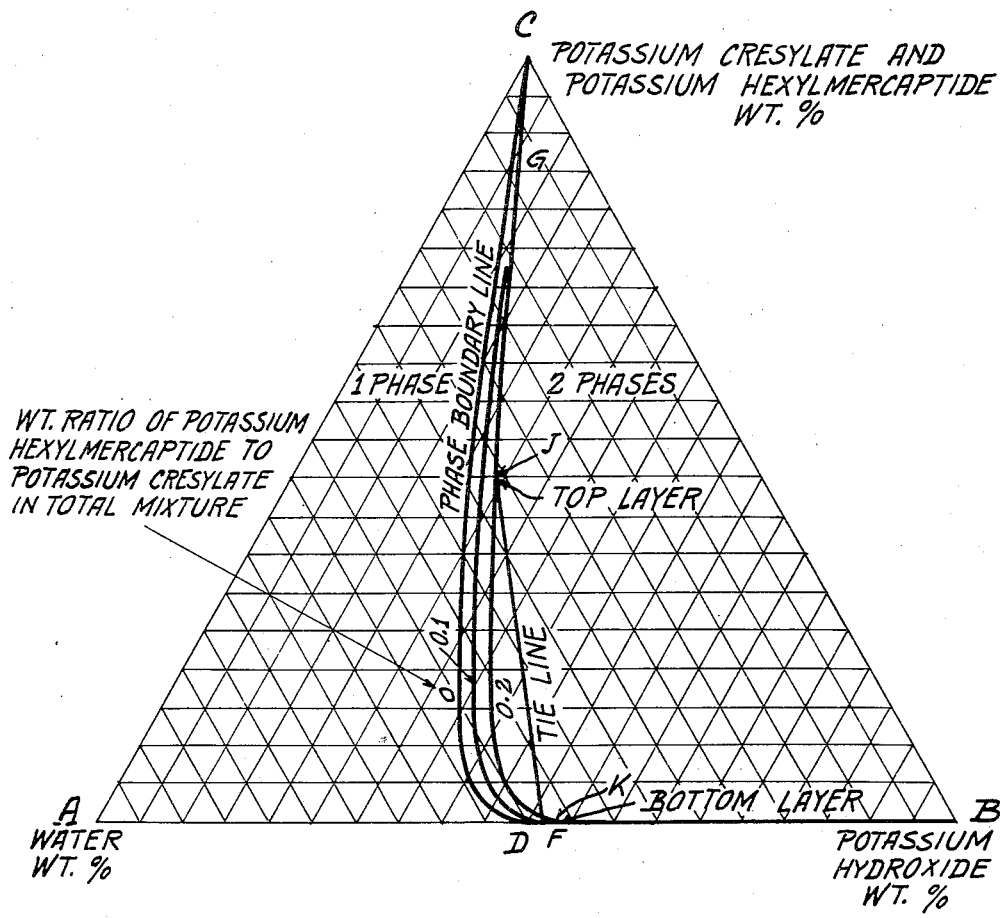
Figure 9 is a ternary diagram for the system potassium hexyl mercaptide, potassium hydroxide and water and for the system potassium hexyl mercaptide-potassium cresylate, potassium hydroxide and water in which the ratio of potassium hexyl mercaptide to potassium cresylate is up to 0.2 at 90° F.
Figure 10:
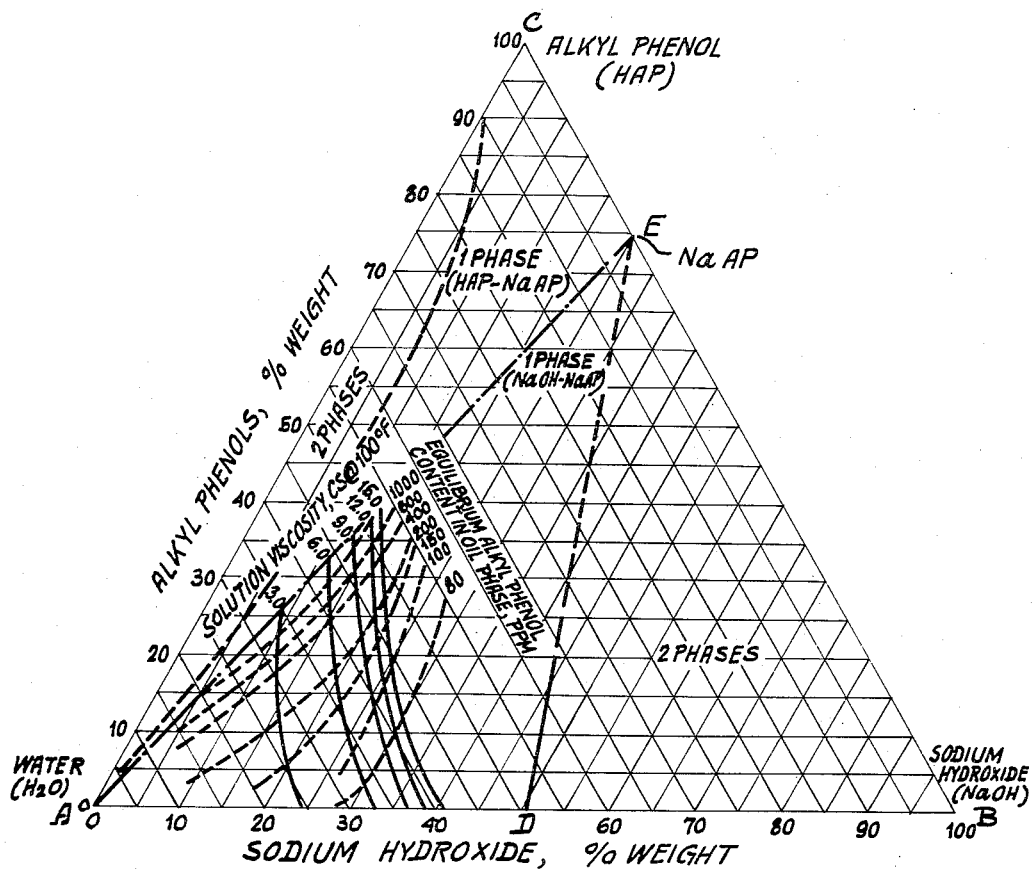
Figure 10 is a ternary diagram for the system sodium hydroxide, alkyl phenols (cresols) and water at 80° F.

The foregoing can be stated as follows: for an operating temperature of 90° F. two-phase treating media having compositions represented by points within the area CDB of Figure 3; within the area CDB of Figure 6; within the area CDB of Figure 7; within the area CDB of Figure 8; and within the area CDB of Figure 9 can be used. For an operating temperature of 80° F. two-phase treating mixtures having compositions represented by points within the area EDB of Figure 5 and within the area EDB of Figure 10 can be used. For an operating temperature of 90° F. solutizer salt phases having compositions represented by points on the phase boundary lines of Figures 3, 6, 7, 8 and 9 can be used as the sole extracting medium. For an operating temperature of 80° F. solutizer salt phases having compositions represented by points on the phase boundary lines of Figures 5 and 10 can be used as the sole extracting medium. For operating at 90° F. alkali metal hydroxide solutions having compositions represented by points in the section DB of the base line AB of Figures 3, 6, 7, 8 and 9 can be used as the sole extracting medium. For an operating temperature of 80° F. alkali metal hydroxide solutions having compositions represented by points in the section DB of base line AB of Figures 5 and 10 can be used as the sole extracting medium. It is also to be understood that complementary solutions or phases are solutions or phases having compositions such that they are mutually substantially immiscible. Thus, at 80° F. a KOR phase containing about 39 weight percent cresols, about 35 weight percent potassium hydroxide and about 26 weight percent water and a KOH phase containing 51 weight percent potassium hydroxide and 49 weight percent water are complementary phases because they are mutually substantially immiscible or the KOR phase is the complementary phase of the KOH phase and vice versa. Similarly, at 90° F. a KOR phase containing about 64 weight percent potassium cresylates, about 13 weight percent potassium hydroxide, and about 23 weight percent water is a complementary phase of a KOH phase containing about 54 weight percent potassium hydroxide and about 46 weight percent water.

The extraction of the mercaptans from the hydrocarbon mixtures containing the same is carried out at about 60° F. to about 150° F. Conversion of a fat KOH to a lean KOH phase is carried out at about 60° F. to about 300° F. For example, when 25 volumes of KOR solution containing 190 parts by weight of mercaptan-sulfur are mixed with 75 volumes of KOH solution containing 150 parts by weight of mercaptan-sulfur, stratified, and separated, the resultant KOR contained 330 parts by weight of mercaptan-sulfur and the KOH phase contained 10 parts by weight of mercaptan-sulfur. These results are presented in Table III.

*Table IV*

|  | Before mixing | | After mixing | | Percent RSH-S extracted |
|---|---|---|---|---|---|
| Layer | KOR | KOH | KOR | KOH | |
| Volume | 25 | 75 | 28 | 72 | |
| RSH-S weight | 190 | 150 | 330 | 10 | 97 |

The present application is a continuation-in-part of co-pending application for United States Letters Patent Serial No. 378,034, filed September 2, 1953, now abandoned, in the names of Frank W. Brooks, Jr. and Claiborne A. Duval, Jr. which in turn is a continuation-in-part of co-pending application for United States Letters Patent Serial No. 312,336, filed September 30, 1952, now abandoned, in the names of Frank W. Brooks, Jr. and Claiborne A. Duval, Jr.

We claim:

1. A method of regenerating alkali metal hydroxide solutions containing mercaptides which comprises mixing fouled, aqueous alkali metal hydroxide solution free of alkali metal alkyl phenolates in amount sufficient to form two substantially immiscible phases at a temperature within the range of about 60° to about 150° F. and containing mercaptides with an amount of alkali metal alkyl phenolates sufficient to extract substantially all of said mercaptides from said alkali metal hydroxide solution, said mixture containing sufficient alkali metal hydroxide to form with said alkali metal alkyl phenolates at a temperature within the range of about 60° to about 150° F. a two-phase system consisting of an upper aqueous alkali metal hydroxide-alkali metal alkyl phenolate phase and a lower aqueous, alkali metal hydroxide solution until substantially all of the mercaptides in said fouled aqueous alkali metal hydroxide solution migrate to an aqueous alkali metal hydroxide-alkali metal alkyl phenolate solution to obtain an aqueous alkali metal hydroxide solution containing not more than about 5 percent of the mercaptides originally present in said fouled alkali metal hydroxide solution, stratifying said mixture to obtain an upper aqueous alkali metal hydroxide-alkali metal alkyl phenolate phase containing said migrated mercaptides and a lower phase comprising said aqueous alkali metal hydroxide solution containing not more than about 5 percent of the mercaptides originally present in said fouled alkali metal hydroxide solution, and separating said lower phase from said upper phase.

2. The method of regenerating aqueous alkali metal hydroxide solutions containing mercaptides as set forth and described in claim 1 wherein the alkali metal hydroxide is potassium hydroxide, and wherein the alkali metal alkyl phenolates are the potassium salts of alkyl phenols boiling within the range about 105° F. to about 650° F.

3. The method of regenerating aqueous alkali metal hydroxide solutions containing mercaptides as set forth and described in claim 1 wherein the alkali metal hydroxide is sodium hydroxide, and wherein the alkali metal alkyl phenolates are the sodium salts of alkyl phenols boiling within the range about 105° F. to about 650° F.

4. The method of regenerating potassium hydroxide solutions containing mercaptides which comprises mixing an aqueous solution consisting essentially of about 37 to about 60 weight percent potassium hydroxide and the balance, water, to make 100 percent and containing mercaptides with a potassium alkyl phenolate-potassium hydroxide-water mixture comprising about 1 to about 68 weight percent alkyl phenols, about 33 to about 39 weight percent potassium hydroxide and the balance, to make 100 weight percent, water, to form a two-phase mixture said two-phase mixture being formed at a temperature within the range of about 60° F. to about 150° F., separating an upper potassium alkyl phenolate-water phase containing all but a minor proportion of the mercaptides of said fouled aqueous solution from a lower aqueous potassium hydroxide phase, and stripping mercaptans from said alkyl phenolate phase.

5. The method of regenerating potassium hydroxide solutions containing mercaptides as set forth and described in claim 4 wherein the alkyl phenols boil within the range of about 105° F. and to about 650° F.

6. A process for removing mercaptans from hydrocarbon fluids which comprises contacting in an extraction zone having at least one extraction stage a hydrocarbon fluid containing mercaptans with a liquid extracting medium consisting essentially of the cresylate phase of a liquid mixture comprising alkali metal hydroxide, cresols boiling within the range of about 105° F. and about 650° F., and water in proportions to form at a temperature within the range of about 60° F. to about 150° F. a cresylate phase comprising alkali metal cresylates, alkali metal hydroxide and water, and a mutually substantially immiscible hydroxide phase comprising alkali metal hydroxide and water, to produce treated hydrocarbon fluid and fouled cresylate extracting medium containing extracted mercaptans as mercaptides, separating treated hydrocarbon fluid from fouled cresylate extracting medium, heating said fouled cresylate extracting medium to hydrolyze said mercaptans to produce regenerated cresylate treating medium, contacting said regenerated cresylate extracting medium with aqueous alkali metal hydroxide substantially immiscible therewith at a temperature within the range about 60° F. to about 150° F. to restore the free alkalinity of said regenerated cresylate extracting medium and to provide a fortified, regenerated cresylate extracting medium, separating said aqueous alkali metal hydroxide from said fortified, regenerated cresylate extracting medium at a temperature within the range of about 60° F.

to about 150° F., and returning said fortified, regenerated cresylate extracting medium to said extraction zone.

7. The method for removing mercaptans from hydrocarbon fluids as set forth and described in claim 6 wherein the hydrocarbon fluid is gasoline and the alkali metal hydroxide is potassium hydroxide.

8. The method for removing mercaptans from hydrocarbon fluids as set forth and described in claim 6 wherein the hydrocarbon fluid is gasoline, wherein the alkali metal hydroxide is potassium hydroxide, wherein the fouled cresylate extracting medium contains entrained gasoline, wherein the fouled cresylate extracting medium is diluted with an at least equal amount of water, wherein entrained gasoline is separated from diluted fouled cresylate extracting medium, and wherein during the volatilizing of the mercaptans an amount of water at least equal to the aforesaid water of dilution is volatilized.

9. A process for removing mercaptains from naphtha which comprises contacting a mercaptan-containing naphtha in an extracting zone having at least one extracting stage with a cresylate extracting medium comprising about 40 weight percent potassium salts of cresols boiling within the range of about 105° F. to about 650° F., about 23 weight percent potassium hydroxide, and about 37 weight percent water to obtain treated naphtha and fouled cresylate extracting medium containing extracted mercaptans as mercaptides, separating said treated naphtha from said fouled cresylate extracting medium, heating said separated fouled cresylate extracting medium to hydrolyze said mercaptides to mercaptans and to volatilize mercaptans to provide a regenerated cresylate extracting medium, and returning said regenerated cresylate extracting medium to said extraction zone for contact with further amounts of mercaptan-containing naphtha.

10. The process for removing mercaptans from naphtha as set forth and described in claim 9 wherein the fouled cresylate extracting medium is diluted with at least an about equal amount of water, wherein entrained naphtha is separated from diluted, fouled, cresylate extracting medium, wherein said diluted, fouled, cresylate extracting medium is heated to hydrolyze mercaptans and to volatilize mercaptans and at least a part of water of dilution to provide regenerated cresylate extracting medium, wherein said regenerated cresylate extracting medium is contacted with an aqueous solution of potassium hydroxide substantially immiscible with said regenerated cresylate extracting medium at a temperature within the range of about 60° F. to about 150° F. to restore the free alkalinity of said regenerated cresylate extracting medium, wherein said fortified, regenerated cresylate extracting medium is separated from said aqueous solution of potassium hydroxide at a temperature within the range of about 60° F. to about 150° F. at which said fortified, regenerated cresylate extracting medium and said aqueous solution of potassium hydroxide are substantially immiscible, and wherein said separated fortified, regenerated cresylate extracting medium is returned to said extraction zone.

11. A process for removing mercaptans from hydrocarbon fluids which comprises contacting in an extraction zone having at least one extraction stage a hydrocarbon fluid containing mercaptans with a liquid cresylate-hydroxide extracting medium consisting essentially of a liquid mixture comprising alkali metal hydroxide, cresols boiling within the range of about 105° F. to about 650° F., and water in proportions to form two substantially immiscible liquid phases at a temperature within the range of about 60° F. and about 150° F., one of said phases being a liquid cresylate phase containing alkali metal hydroxide, alkali metal cresylate and water, and the other of the aforesaid phases being a liquid hydroxide phase containing alkali metal hydroxide and water, to obtain treated hydrocarbon fluid and fouled liquid cresylate-hydroxide extracting medium containing extracted mercaptans as mercaptides, separating treated hydrocarbon fluid from fouled liquid cresylate-hydroxide extracting medium, holding said fouled liquid cresylate-hydroxide extracting medium at a temperature within the range of about 60° F. to about 150° F. to form a fouled liquid cresylate phase and a liquid hydroxide phase containing not more than about 5 percent of said extracted mercaptans, separating said fouled cresylate phase from said hydroxide phase to obtain regenerated hydroxide phase, heating said fouled cresylate phase to hydrolyze mercaptides to mercaptans and to volatilize said mercaptans to provide regenerated liquid cresylate phase, mixing said regenerated hydroxide phase and said regenerated cresylate phase to form regenerated, liquid cresylate-hydroxide extracting medium, and returning said regenerated, liquid cresylate-hydroxide extracting medium to said extraction zone.

12. The process for removing mercaptans as set forth and described in claim 11 wherein the alkali metal hydroxide is potassium hydroxide.

13. A method for removing mercaptans from three hydrocarbon fluids which comprises establishing three extraction zones each having at least one extraction stage, in the first of said extraction zones contacting a first hydrocarbon fluid containing predominantly mercaptans having 1 to 4 carbon atoms with liquid hydroxide extracting medium (as hereinafter defined) to obtain treated first hydrocarbon fluid and fouled hydroxide extracting medium containing extracted $C_1$ to $C_4$ mercaptans as mercaptides, separating treated first hydrocarbon fluid from fouled hydroxide extracting medium, in each of the other two extraction zones contacting a hydrocarbon fluid containing predominantly mercaptans having more than 4 carbon atoms with liquid cresylate extracting medium (as hereinafter defined) to obtain two treated hydrocarbon fluids and fouled liquid cresylate extracting medium containing extracted $C_4+$ mercaptans as mercaptides, separating the two treated hydrocarbon fluids from fouled liquid cresylate extracting medium containing $C_4+$ mercaptides, mixing said fouled liquid hydroxide extracting medium containing $C_1$ to $C_4$ mercaptides with fouled cresylate extracting medium containing $C_4+$ mercaptides to form a liquid mixture, holding said liquid mixture at a temperature within the range of about 60° F. to about 150° F. to form two mutually substantially immiscible liquid phases, separating at a temperature within the range of about 60° F. to about 150° F. a liquid cresylate phase containing $C_4+$ mercaptides and at least about 95 percent of the $C_1$ to $C_4$ mercaptides contained in said fouled liquid hydroxide extracting medium from a liquid hydroxide phase containing not more than about 5 percent of the aforesaid extracted mercaptans to form a regenerated liquid hydroxide extracting medium, returning said regenerated liquid hydroxide extracting medium to said first extraction zone, heating said separated, fouled, liquid cresylate phase to hydrolyze mercaptides to mercaptans and to volatilize mercaptans to produce regenerated liquid cresylate extracting medium, and returning said regenerated liquid cresylate extracting medium to each of said other two extraction zones, said liquid hydroxide extracting medium and said liquid cresylate extracting medium being the liquid hydroxide phase and liquid cresylate phase respectively of a liquid mixture comprising alkali metal hydroxide, alkali metal salt of alkyl phenols boiling within the range of about 105° to about 650° F. and water in proportions to form at a temperature within the range of about 60° F. to about 150° F. a liquid cresylate phase comprising alkali metal hydroxide, alkali metal salt of said alkyl phenols and water, and a substantially immiscible liquid hydroxide phase comprising alkali metal hydroxide and water.

14. The process for removing mercaptans from a plurality of hydrocarbon fluids as set forth and described in claim 13 wherein the alkali metal hydroxide is potassium hydroxide, wherein the hydrocarbon fluid containing predominantly mercaptans having 1 to 4 carbon atoms is cracked gasoline, wherein the second hydrocarbon fluid is straight run gasoline, and wherein the third hydrocarbon fluid is kerosine, and wherein the regenerated cresylate extracting medium is contacted with substantially immiscible aqueous potassium hydroxide solution to fortify the free alkalinity of said liquid cresylate phase and to form a mixture, and said mixture is separated into a regenerated, fortified cresylate extracting medium and a liquid hydroxide phase at a temperature within the range of about 60 F. to about 150° F. before returning said liquid cresylate extracting medium to said second and third extraction zones.

15. The method for removing mercaptans from hydrocarbon fluids as set forth and described in claim 6 wherein the hydrocarbon fluid is gasoline and the alkali metal hydroxide is sodium hydroxide.

16. The method for removing mercaptans from hydrocarbon fluids as set forth and described in claim 6 wherein the hydrocarbon fluid is gasoline, wherein the alkali metal hydroxide is sodium hydroxide, wherein the fouled cresylate extracting medium contains entrained gasoline, wherein the fouled cresylate extracting medium is diluted with an at least equal amount of water, wherein entrained gasoline is separated from diluted fouled cresylate extracting medium, and wherein during the volatilizing of the mercaptans an amount of water at least equal to the aforesaid water of dilution is volatilized.

17. A process for removing mercaptans from naphtha which comprises contacting a mercaptan-containing naphtha in an extraction zone having at least one extracting stage with a cresylate extracting medium comprising about 7 to about 20 weight percent cresols boiling within the range of about 105° F. to 650° F., about 43 to about 48 weight percent of sodium hydroxide, and about 37 to about 45 weight percent water to make 100 percent, to obtain treated naphtha and fouled cresylate extracting medium containing extracted mercaptans as mercaptides, separating said treated naphtha from said fouled cresylate extracting medium, heating said separated fouled cresylate extracting medium to hydrolyze said mercaptides to mercaptans and to volatilize mercaptans to provide a regenerated cresylate extracting medium, and returning said regenerated cryslate extracting medium to said extraction zone for contact with further amounts of mercaptan-containing naphtha.

18. A process for removing mercaptans from naphtha as set forth and described in claim 9 wherein the fouled cresylate extracting medium is diluted with at least an about equal amount of water, wherein entrained naphtha is separated from diluted, fouled, cresylate extracting medium, wherein said diluted, fouled cresylate extracting medium is heated to hydrolyze mercaptans and to volatilize mercaptans and at least a part of water of dilution to provide regenerated cresylate extracting medium, wherein said regenerated cresylate extracting medium is contacted with an aqueous solution of sodium hydroxide substantially immiscible with said regenerated cresylate extracting medium at a temperature within the range of about 60° F. to about 150° F. to restore the free alkalinity of said regenerated cresylate extracting medium, wherein said fortified, regenerated cresylate extracting medium is separated from said aqueous solution of sodium hydroxide at a temperature within the range of about 60° F. to about 150° F. at which said fortified, regenerated cresylate extracting medium and said aqueous solution of sodium hydroxide are substantially immiscible, and wherein said separated fortified, regenerated cresylate extracting medium is returned to said extraction zone.

19. The process for removing mercaptans as set forth and described in claim 11 wherein the alkali metal hydroxide is sodium hydroxide.

20. The process for removing mercaptans from a plurality of hydrocarbon fluids as set forth and described in claim 13 wherein the alkali metal hydroxide is sodium hydroxide, wherein the hydrocarbon fluid containing predominantly mercaptans having 1 to 4 carbon atoms is cracked gasoline, wherein the second hydrocarbon fluid is straight run gasoline, and wherein the third hydrocarbon fluid is kerosene, and wherein the regenerated cresylate extracting medium is contacted with substantially immiscible aqueous sodium hydroxide solution to fortify the free alkalinity of said liquid cresylate phase and to form a mixture, and said mixture is separated into a regenerated, fortified cresylate extracting medium and a liquid hydroxide phase at a temperature within the range of about 60° F. to about 150° F. before returning said liquid cresylate extracting medium to said second and third extraction zones.

References Cited in the file of this patent

UNITED STATES PATENTS 2,202,039    Yarbroff et al. _____ May 28, 1940

UNITED STATES PATENT OFFICE
Certificate of Correction

Patent No. 2,850,434 — September 2, 1958

Frank W. Brooks, Jr., et al.

It is hereby certified that error appears in the printed specification of the above numbered patent requiring correction and that the said Letters Patent should read as corrected below.

Column 4, line 18, for "alky" read —alkyl—; column 9, second table, line 9 thereof, for "Between dilution" read —Before dilution—; column 13, line 36, for "mercapitude" read —mercaptide—; line 44, for "gasoline" read —gasolines—; column 16, line 5, for "hydrocarbons" read —hydrocarbon—; line 6, for "mixtures" read —mixture—; line 15, for "cercaptan" read —mercaptan—; column 18, line 39, for "materiallly" read —materially—; line 68, for "to" read —of—; column 19, line 30, before "line" strike out "base"; column 22, line 6, before "preferably" insert —and—; column 25, line 30, for "staturated wtih" read —saturated with—; column 26, line 49, for "towers" read —tower—; column 27, line 49, for "decentation" read —decantation—; line 61, for "mercaptnas" read —mercaptans—; column 31, line 21, for "containing" read —contacting—; line 22, for "hydrocrabon" read —hydrocarbon—; line 24, for "liqjuid" read —liquid—.

Signed and sealed this 28th day of April 1959.

[SEAL]

Attest:
T. B. MORROW,
*Attesting Officer.*

ROBERT C. WATSON,
*Commissioner of Patents.*